United States Patent
Dohi et al.

(10) Patent No.: US 11,104,004 B2
(45) Date of Patent: *Aug. 31, 2021

(54) BALLISTIC ROBOT SYSTEM WITH SPIN AND OTHER CONTROLLED MOTION OF ROBOT DURING FLIGHT

(71) Applicant: DISNEY ENTERPRISES, INC., Burbank, CA (US)

(72) Inventors: Anthony Paul Dohi, Pasadena, CA (US); Steven Niels Christensen, San Mateo, CA (US); Mark Sox Setrakian, Los Angeles, CA (US); David Loyal Christensen, Burbank, CA (US); Grant Masaru Imahara, Los Angeles, CA (US); Morgan T. Pope, Burank, CA (US); Scott Frazier Watson, Marina Del Ray, CA (US); Günter D. Niemeyer, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,952

(22) Filed: Sep. 23, 2020

(65) Prior Publication Data

US 2021/0001485 A1 Jan. 7, 2021

Related U.S. Application Data

(63) Continuation of application No. 15/964,710, filed on Apr. 27, 2018, now Pat. No. 10,807,244.

(51) Int. Cl.
*B25J 9/16* (2006.01)
*B25J 9/06* (2006.01)
(Continued)

(52) U.S. Cl.
CPC ............... *B25J 9/1682* (2013.01); *B25J 9/06* (2013.01); *B25J 9/144* (2013.01); *B25J 9/1664* (2013.01);
(Continued)

(58) Field of Classification Search
None
See application file for complete search history.

(56) References Cited

U.S. PATENT DOCUMENTS 5,562,573 A 10/1996 Harinishi
10,807,244 B2 * 10/2020 Dohi ..................... B25J 9/1694
(Continued)

OTHER PUBLICATIONS

Chang-Siu, et al, "A Nonlinear Feedback Controller for Aerial Self-Righting by a Tailed Robot," 2013 IEEE International Conference on Robotics and Automation (ICRA); May 6-10, 2013; Karlsruhe, Germany, IEEE, US, May 6, 2013, pp. 32-39.
(Continued)

*Primary Examiner* — Jeff A Burke
*Assistant Examiner* — Zachary Joseph Wallace
(74) *Attorney, Agent, or Firm* — Snell & Wilmer L.L.P.; Kent A. Lembke

(57) ABSTRACT

Systems and corresponding control methods providing a ballistic robot that flies on a trajectory after being released (e.g., in non-powered flight as a ballistic body) from a launch mechanism. The ballistic robot is adapted to control its position and/or inflight movements by processing data from onboard and offboard sensors and by issuing well-timed control signals to one or more onboard actuators to achieve an inflight controlled motion. The actuators may move an appendage such as an arm or leg of the robot or may alter the configuration of one or more body links (e.g., to change from an untucked configuration to a tucked configuration), while other embodiments may trigger a drive mechanism of an inertia moving assembly to change/move (Continued)

the moment of inertia of the flying body. In-flight controlled movements are performed to achieve a desired or target pose and orientation of the robot during flight and upon landing.

23 Claims, 21 Drawing Sheets

(51) Int. Cl.
  *B25J 9/14*      (2006.01)
  *B25J 13/08*     (2006.01)

(52) U.S. Cl.
  CPC ........... *B25J 9/1694* (2013.01); *B25J 13/088* (2013.01); *Y10S 901/01* (2013.01); *Y10S 901/09* (2013.01)

(56) References Cited

U.S. PATENT DOCUMENTS

| | | |
|---|---|---|
| 2016/0129593 A1 | 5/2016 | Wolowelsky et al. |
| 2017/0036349 A1 | 2/2017 | Dubrovsky et al. |
| 2019/0108472 A1 | 4/2019 | Sweeney et al. |

OTHER PUBLICATIONS

Extended European Search Report, Application No. 19154934.4-1011, dated Aug. 22, 2019.

Mirko Kovac et al., "Steerable Miniature Jumping Robot", Dec. 30, 2009, Autonomous Robots, vol. 28, Issue 3, pp. 295-306 (Year: 2009).

Masaki Yamakita et al., "Motion Control for Robust Landing of Acrobat Robot (SMB)", Oct. 2003, Intl. Conference on Intelligent Robots and Systems, Las Vegas, NV, pp. 1141-1146 (Year. 2003).

\* cited by examiner

BALLISTIC ROBOT SYSTEM WITH SPIN AND OTHER CONTROLLED MOTION OF ROBOT DURING FLIGHT

CROSS REFERENCE TO RELATED APPLICATIONS

This application is a continuation of U.S. patent application Ser. No. 15/964,710, filed Apr. 27, 2018, which is incorporated herein by reference in its entirety.

BACKGROUND

1. Field of the Description

The present description relates, in general, to robots (or animatronic devices, as these terms may be used interchangeably herein) and robotic motion control technology, and, more particularly, to robots and robot control methods adapted to control spin and other movements of the robot during non-powered flight such as during travel as a projectile or ballistic body along a trajectory or on a travel path established, at least in part, by a launching mechanism. The movements of the robot during flight may be selected to provide a landing with a desired or target orientation and/or pose upon a landing surface (e.g., a surface of a catching assembly that may include a pad, a net, or the like).

2. Relevant Background

Robots or actuated animatronic devices are typically ground based. These ground-based robots often are fixed in a single position or are mobile with wheels or tracks to roll on a surface or legs to walk about a space. To date, there has been very little to no effort to provide robots that can fly through a space with desired movements such as movements that simulate spinning, rotation, flipping, and other actions of a flying superhero, of an acrobatic character, or the like. Inflight movements for a flying robot have recently come into demand to provide unique and surprising entertainment to audiences in settings where it may be difficult to utilize live performers.

To date, most efforts at controlling a robot's movements while in the air have involved relatively complex robotic devices and controls designed to be able to successfully perform relatively simple jumps or similar movements. For example, some robots have been designed with a tail, and the tail is moved while the robot is in the air in an attempt to control the robot's specific orientation upon landing but without any other goals for control during flight. In another example, legged robots are controlled to move their legs during jumping again to control the singular pose or orientation of the robot when it lands. While useful in some applications, these robots are expensive to build and only provide a desired orientation on landing. These robotic devices do not provide a mid-air or aerial show that may include multiple flips, twists, mutations, and poses. As a result, there remains a demand for robot designs that provide control over spin or rotation during flight to provide control over pose and orientation throughout flight and control over the location of one-to-all actuators at the time of landing (e.g., the entire landing pose rather than just the orientation of, for example, the wheels or the landing foot).

In other areas of research, flying machines such as drones provide analogous entertainment in the air. However, to date, developments with drones and similar devices has focused on powered flight that achieves position and motion control using motorized propulsion. As a result, existing drones do not provide articulated motion that would simulate complex motions such as those made by a gymnast or stunt actor. Indeed, the focus on stability and control in drones has led to rigid bodies that intentionally do not move during powered flight. Hence, there remains a need for new designs for robots to provide motion control during their non-powered flight.

SUMMARY

Briefly, systems and corresponding control methods (or "ballistic animatronics") are described herein that provide a ballistic robot that flies on a trajectory after being released (e.g., in non-powered flight as a ballistic body or projectile) from a launch or propulsion mechanism. The ballistic robot is adapted to control its position and/or inflight movements by processing data from onboard and offboard sensors and by issuing well-timed control signals to one or more onboard actuators to achieve an inflight controlled motion. The actuators may move an appendage such as an arm or leg of the robot or may alter the configuration of one or more body links (e.g., to change from an untucked configuration to a tucked configuration (or from tucked to untucked)), while other embodiments may trigger a drive mechanism of an inertia moving assembly to change/move the moment of inertia of the flying body.

In some cases, pre-launch controlled movements, such as while on a swing or pendulum-type launch mechanism, are performed by the ballistic robot to pump energy into the body to achieve a desired trajectory at launch and/or to perform certain stunts or moves during the flight. In the same or other cases, inflight controlled movements are performed to achieve a desired or target pose and orientation of the robot during flight and upon landing on a landing surface so as to simulate motions of a particular character (or live performer) and/or to enhance survivability of the robot (e.g., to distribute braking forces applied onto the robot body by a catching system).

More particularly, a ballistic robot system is provided for controlling movements pre-launch and inflight movements of a ballistic (non-powered flight) robot and for achieving a target pose and orientation upon landing. The system includes a robot including a controller (hardware (e.g., processor(s)) and software), onboard sensors, a body supporting the controller and onboard sensors, and at least one component that is configured for actuation by the controller. The robot system also includes a catching system with a landing surface and a launch mechanism spaced apart from the landing surface a lateral distance. The launch mechanism operates to first support the robot during a pre-launch process stage during which energy is provided to the body of the robot and to second launch the body of the robot as a ballistic body with a trajectory defining a flight path intersecting the landing surface. During operation of the system, the controller processes data collected by the onboard sensors while flying on the flight path and, in response, generates a control signal to cause the actuation of the at least one component to cause the body to perform a predefined controlled motion prior to impact with the landing surface.

In some embodiments, the predefined controlled motion is adapted and timed during the flying on the flight path to cause the body to have a predefined pose, a predefined orientation, or a predefined landing angle upon impact with the landing surface. In this regard, the processing of the data collected by the controller may include calculating an angular velocity and remaining time prior to the impact with the landing surface to assist in determining when to trigger the control signal to perform the particular movement/motion. The at least one component can be configured for moving the body between a tucked configuration and an untucked configuration, and the predefined controlled motion is a movement from the tucked configuration to the untucked configuration prior to the impact with the landing surface.

In the same or other embodiments, the onboard sensors comprise an inertial measurement unit (IMU) and at least one rangefinder, and the controller processes the data collected by the onboard sensors to determine a current angular velocity and a current height of the body while on the flight path. In such cases, the ballistic robot system may also include an offboard sensor(s) communicating collected data to the controller for processing to determine a current position of the body on the flight path, and the current position can be used by the onboard controller in determining a timing of triggering the control signal. Further, the offboard sensor may include at least one of a motion capture system, a floodlight providing polarized light received by a first photosensor on or in the body, or a laser providing a beam or plane of light received by a second photosensor on or in the body.

In some implementations of the system, the at least one component includes an inertia moving assembly operating in response to the control signal to move the moment of inertia of the body. In other cases, the at least one component comprises an actuator and a positionable appendage or link of the body, and the predefined controlled motion comprises moving the appendage or the link to modify spin of the body about at least one axis.

In these and other cases, the launch mechanism includes a pendulum assembly with an elongate pendulum member, the body of the robot is detachably coupled with an end of the elongate pendulum member, and the pendulum assembly is gravity based or is powered to reach a predefined velocity when the launch is initiated. The controller may operate during the pre-launch process stage to generate a second control signal to cause the actuation of the at least one component to cause the body to move with a second predefined controlled motion prior to the launch of the body on the trajectory. The second control signal can be generated by the controller at a predefined time after initial movement of the elongate pendulum member in the pre-launch process stage, and the second predefined controlled motion can be adapted to cause the body to spin in a predefined manner about at least one axis on the flight path. Further, the at least one component can be configured for moving the body between a tucked configuration and an untucked configuration, and the second predefined controlled motion can be a movement from the untucked configuration to the tucked configuration prior to the launch from the launch mechanism.

In some useful embodiments, the at least one component includes an actuatable element for modifying aerodynamic characteristics of one or more external surfaces of the body of the robot to initiate the predefined controlled motion. In the same or other useful embodiments, an in-flight booster system is provided in the system and is positioned between the launch mechanism and the catching system. This booster system operates to add or remove energy to the body of the robot (such as by impacting it inflight, by catching and then later releasing it after imparting more energy into the body, and so on) while the robot is flying on the flight path and before impact with the landing surface, whereby the trajectory is modified for the robot during its flight.

DETAILED DESCRIPTION

The inventors recognized that there are a number of settings where it may be desirable to provide a "stunt" robot or animatronic device that can be used in place of a live actor or performer to provide a show or entertainment with flying characters that perform acrobatic moves while in midair. To this end, a ballistic robot system (and corresponding control methods to provide ballistic animatronics or "acrobatics" or "stuntronics") was designed that generally includes a ballistic launching mechanism for launching a robot into the air with a trajectory (or onto a flight path). The robot includes an onboard movement control system for providing actuated motion/movements (wholly internally such as with an inertia moving assembly and/or with movements that are visible externally such as by operating one or more actuatable joints or components (e.g., to move the robot body into a tuck pose and back into planar/linear pose and/or to move one or more legs and/or arms to increase or decrease drag or change spin or the like)).

The system uses a set of onboard and offboard sensors to determine a number of parameter values useful in controlling motions of the robot such as height, angular velocity, pose, orientation, and the like, and the onboard motion control system triggers movements at particular points on the trajectory/flight path. The system further includes a catching/receiving system with a landing surface (e.g., a pad or net) upon which the robot lands at the end of its trajectory/flight path, and the movement control system may operate to predict timing of impact with this landing surface and to cause the robot to perform one or more movements to place it in a target landing pose and/or orientation to cause a particular portion of the robot to strike the landing surface first and/or to spread braking forces over a larger surface area of the robot.

Figure 1:
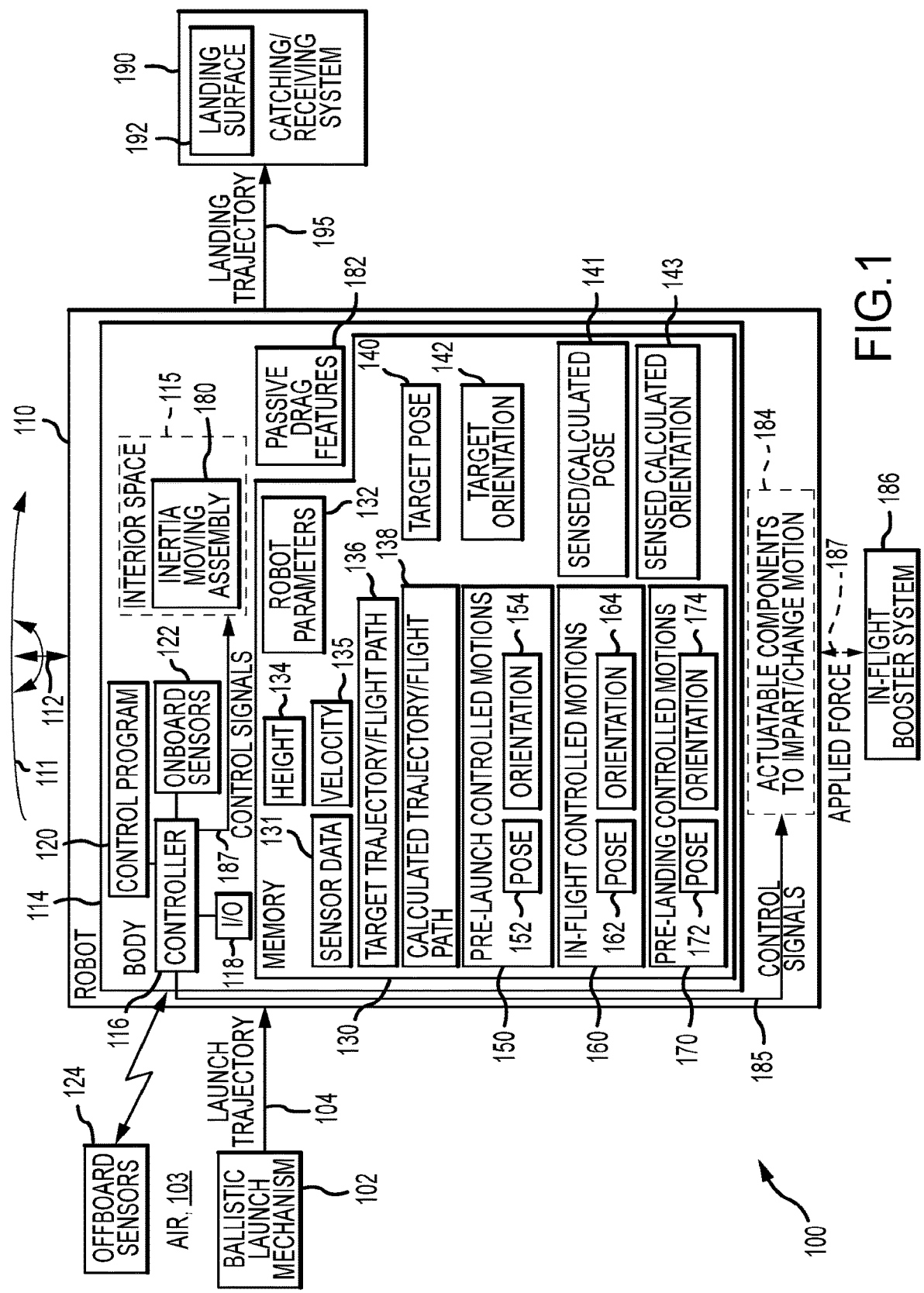
FIG. 1 is functional block diagram of a ballistic robot flight system according to the present description.

FIG. 1 is a functional block diagram of an exemplary ballistic robot flight system 100 that provides controlled movements or animation of a robot 110 during its flight through space or air 103 along a flight path or trajectory until it lands on landing surface 192 of a catching/receiving system 190. The system 100 is "ballistic" in the sense that the robot 110 is not adapted for powered flight, and the system 100 includes a ballistic launch mechanism 102 that is adapted to propel or launch the robot 110 on a launch trajectory or initial flight path 104 as a projectile or ballistic body to cause it to fly through the space/air 103 and land with a landing trajectory 195 on landing surface 192.

The launching mechanism 102 may take a wide variety of forms to practice the system such as a device for throwing, slinging, or catapulting the robot 110 toward the catching system 190. In some embodiments, a motorized pendulum system is used as the projectile launcher 102 with the robot 110 being first attached or coupled to an outer end of a pendulum member (e.g., a wire, a chain, a rope, or the like) that is caused to swing back and forth and then second being unattached or decoupled (or released) from the end of the pendulum member at a particular height to provide the launch trajectory 104. The release may be in response to a control signal from the robot's controller 116 upon detection of a particular robot height 134 or from a system controller (not shown in FIG. 1) or a controller of the launch mechanism 102. The release height and/or other variables may be measured (such as with sensors 122 and/or 124) to choose when to release or otherwise launch the robot 110 and provide a target trajectory/flight path 136 to the landing surface 190.

The catching/receiving system 190 likewise may take many forms to practice the system 100. Typically, the landing surface 192 may be provided as part of a pad or net that is useful to distribute catching and/or braking forces applied to the robot 110 upon impact on the landing surface 192, e.g., to avoid localized application of stopping or braking forces. The catching/receiving system 190 may be configured to apply a constant braking force on the received robot 110. In other implementations, the system 190 is configured to apply a smaller force during an initial or first catching phase such as by providing more give or movement of the netting/padding providing the landing surface initially (such as for first 1 to 2 feet of movement of landing robot 110). In a second or later phase, the braking or stopping force is ramped up by providing more and more resistance to further movement and/or deformation of the landing surface so as to pull all energy out of the ballistic robot 110 and stop its further movement. In either implementation, the system 190 decelerates the robot 110 in a limited amount of space.

The robot 110 flies along the launch trajectory 104 at a particular velocity as shown with arrow 111 and with spin or rotation as shown with arrows 112 (in the vertical plane that may vary its pose during flight and in the horizontal plane that may vary its orientation during flight). The robot 110 has a body 114 (e.g., a torso with one or more appendages moveable via actuators and joints (i.e., actuatable components 184)) in which a controller 116 (e.g., one or more processors) is provided that executes code or software to provide functions of a control program 120. Further, the controller 116 manages operations of input/output (I/O) devices 118 such as a wireless transceiver to communicate with a set of offboard sensors 124 that operate to gather data on the robot 110 as it travels on its trajectory 104 from the launch mechanism 102 to the landing surface 190. Further, onboard sensors 122 are provided to measure/sense additional data on the robot's travel, and the combination of these sensor outputs is stored by the controller 116 in memory as sensor data 131 for processing by the control program 120 to facilitate in-flight control of motions/movements of the robot 110.

Further, the robot 110 includes memory or data storage 130 whose access and operations are managed by the controller 116. The memory 130 is used to store data useful to the control program 120 for selectively controlling movements of the robot 110 during flight such as by operations of an inertia moving assembly 180 and/or actuatable components 184 and, specifically, for generating control signals 181, 185 at specific times during flight of the robot 110. As shown, the memory 130 stores sensor data 131 from the onboard sensors 122 and offboard sensors 124. This data 131 may be processed to determine the robot's current height 134 and velocity 135. A set of robot parameters 132 may also be stored in memory 130 for use by the control program 120 in performing calculations such as the robot's weight and expected drag with its current configuration, which may be used to calculate a trajectory/flight path 138 for the robot 110 upon launch from launch mechanism 102 (e.g., each launch may not be perfect such that it may not provide a target trajectory/flight path 136).

The memory 130 may be used to store a set of pre-launch controlled motions 150 that may be used to set, via use of the inertia moving assembly 180 and/or the actuatable components 184, the robot's pose 152 and orientation 154 during launching (e.g., to provide pumping of the robot's body 114 to increase the launch energy) and at launch to set an initial pose and orientation of the robot 110 during flight. A set of in-flight controlled motions 160 may also be provided in memory 130 for use by the control program 120 in initiating in-flight motions or movements to provide a desired pose 162 and a desired orientation 164 of the robot at one or more points along the robot's trajectory (e.g., target or actual) 136, 138. Further, the memory 130 can store a set of pre-landing controlled motions 170 used to define the robot's pose 172 and orientation 174 just prior to and/or at impact with the landing surface 190 (e.g., to cause the robot 110 to land upon a particular body component or area that is more durable or larger in area or to land so as to have a larger area concurrently contacting the surface 190 to distribute braking forces).

As shown, the memory 130 is used to store a target pose(s) 140 and a target orientation(s) 142, which may be defined for the robot 110 at any point (or multiple points) along its target trajectory/flight path 136. Further, based on processing of the sensor data 131, the control program 120 may generate a sensed or calculated pose(s) 141 and orientation(s) 143 at any point along the actual trajectory 136. The targeted and actual poses and orientations can be compared by the control program 120 and adjustments can be made, in some cases, with control signals to the inertia moving assembly 180 and/or the actuatable components 184 (or with modifications to the in-flight controlled motions 160 and/or pre-landing controlled motions 170).

In some embodiments, the sensors 122 include an inertial measurement unit (IMU) to provide velocity and/or acceleration data for the body 114 to help determine the present orientation 143. The IMU will not provide an absolute position for the body 114 (distance, angle, or the like) such that the sensors 122 preferably include one or more external-looking sensors to correct for these deficiencies of the IMU by providing data useful for determining the height of the robot 110 and/or other parameters (e.g., current orientation and/or pose). The external-looking sensors may include LIDAR, laser, and/or ultrasound-based devices facing the ground and/or the landing surface 190 (at least periodically during the flight on trajectories 104, 195).

The controller 116 with program 120 may process the sensor data 131 to determine/calculate the present orientation 143 and pose 141 of the robot's body 114 as well as the present velocity 135. All or a portion of the sensor data 131 and determined parameters are then used on a periodic (or nearly continuous) manner by the controller 116 and its program 120 to predict whether the rotation/spin (or other movement) 112 of the robot's body 114 should be modified/controlled to achieve the target orientation 142 and/or the target pose 140 during flight and/or at the time of contact with the landing surface 190. If so, the controller 116 with program 120 determines a desired modification of the spin/movement 112 to better hit these targets 140, 142. For example, a shifting or movement of the inertia of the body 114 may be provided by inertia moving assembly 180 that may achieve the modification of the spin 112, and, in response, control signals 181 are generated to operate the drive mechanism of the assembly 180 to move/shift the inertia of the body 114 so as to implement the determined modification of the spin/rotation 112. In other cases, movements of the actuatable components 184 are determined that are useful to modify movements 112 to achieve the targets 140, 142. This control process is repeated periodically (e.g., nearly continuously) during the flight of the ballistic robot 110 to control the rotation/spin 112 to achieve one or both of the target orientation 142 and the target pose 140 during flight and/or at landing.

Particularly with regard to controlled motions/movements, the robot 110 may include an inertia moving (or shifting) assembly 180 positioned in an interior space 115 of the body 114. The assembly 180 is configured to selectively shift or move the inertia of the robot's body 114 (e.g., in either direction in one, two, or more planes (e.g., in the horizontal plane and/or in the vertical plane)). The assembly 180 may take the form of any of the inertia moving assemblies described in detail in U.S. patent application Ser. No. 15/719,847, filed Sep. 9, 2017 that is entitled "Robot With Inertia Shifting Assembly Providing Spin Control During Flight" and that is incorporated herein in its entirety.

Further, the robot 110 may include passive drag features 182 upon one or more exterior surfaces of the body 114 to achieve a desired motion 112 of the body 114 during flight. Additionally, one or more actuatable components 184 may be included on or as part of the body 114 that can be actuated in response to control signals 185 from the controller 116 to modify the motion/movement 112 of the robot 110 during system operations to better achieve a target pose 140 or target orientation 142 or to provide a particular acrobatic or stunt movement with the body 114. For example, the components 184 may include active drag features that change drag on one or more surfaces of the body 114 during flight. In another example, a robot's body 114 may have one or more joints that are operable via an actuator/drive mechanism to modify the shape/pose of the robot 110 (e.g., to cause the body to tuck and untuck), to change spin in one or more planes such as by sticking arms (or other appendages) out or pulling these in toward the torso of the body 114, or the like (and as discussed in greater detail below).

In some embodiments of the system 100, it may be useful to provide ballistic animatronics by launching the robot 110 with the launching mechanism 102 and have the robot 110 complete desired maneuvers entirely under the energy imparted at launch on trajectory 104. However, in some implementations, operating with fixed energy is an undesirable constraint on the flight length and the variety of maneuvers that can be accomplished. To address this issue, the system 100 may include an in-flight booster system 186 that is adapted to apply a force 187 to add energy to the robot 110 to cause it to deviate from the launch trajectory 104, e.g., to have a higher, faster, longer, or otherwise differing trajectory to the landing surface 190 (which may be moved farther away from the launch mechanism 102 to suit the longer trajectory/flight path provided by the system 186).

The system 186 may take a variety of forms to add (or remove) energy from an otherwise ballistic flying robot 110. For example, the system 186 may be adapted to mechanically couple and decouple moving objects with the robot 110 as it flies from mechanism 102 to catching system 190 and landing surface 192. In one implementation of system 186, objects are used that intentionally impact the robot 110 in its flight to speed up or slow down the robot 110 (e.g., modify its trajectory from the launch trajectory 104) and/or modify its spin 112 and/or its pose and/or orientation. In another implementation of system 186, the robot 110 is caught (or temporarily is coupled) with a moving member of the system 186 to impart energy into the "hand" or other portion of the robot body 114 and also inertia shifting and spin shifting mechanisms can be used to change motion throughout the robot's body 114. In one case, the system 186 includes a trapeze bar (active or passive), and the robot 110 is adapted to catch the trapeze bar or to interact with another animatronic device to gain or shed energy to modify its present trajectory and/or to impart a desired movement to the robot 110 (e.g., to change its pose or orientation and/or to perform a particular acrobatic move). In another case, the system 186 is configured to impart air streams or puffs of gas to impart energy or force 187 to the robot's body 114 during its flight from the launching mechanism 102 to the landing surface 192.

One goal of ballistic animatronics provided with system 100 is to provide mechanisms, such as robot 110, that fly after being released from a launch or propulsion mechanism 102 and control their position and in-air movement using one or more actuators (as part of an onboard movement control system) such as with inertia moving assembly 180 and/or actuatable components 184. For example, one way of providing control over in-flight movement is to transfer inertia by moving mass within the body of the robot under the control of actuators. This is much like how a gymnast or acrobat alters their position in mid-flight, and such control is achieved through the selective use of the inertia moving assembly 180. A second example of movement or motion control is with spin or torque-free rotations, and this can be provided with low inertia components in combination with high, actuation controlled spin to alter position and motion in flight, which are provided as part of actuatable components 184 controlled by controller 116 and program 120. A third example of movement control is to provide actuated and passive aerodynamic surfaces (provided in components 184 and as passive surfaces/features 182). Aerodynamic surfaces placed conspicuously on external surfaces of the robot body or artistically disguised on the body's surfaces can be used to create lift and drag to change local motion of appendages or global motion of the entire robot. In a further example, the actuatable components (or motion control components) 184 may include compressed gas onboard (or even thrusters/explosive devices) to selectively release energy to change angular momentum or otherwise alter the orientation 143 of the robot 110 during its flight.

The inventors designed prototypes of the system 100 to provide flying animatronics or robots that animate during flight by changing pose/position and orientation. Initial efforts used a swing/pendulum to provide the ballistic launch mechanism 102 with an actuated release to provide initial energy into the flying object/robot 110 (to launch it on the trajectory 104). Energy in a flying object that is disconnected from a swing is determined by its initial conditions such as height at point of release, position in the swing arc where release occurs (e.g., launch angle), and twist imposed by the launch mechanism on the robot/flying object. Prior work using pendulum launch systems relied on timing and careful control of the physical components of the pendulum system to try to achieve a repeatable launch and object trajectory. This lower level of control is inadequate for a production entertainment environment and at the same time can be very constraining on animation that can be implemented with the flying object.

Hence, the inventors discovered that it would be desirable to instrument the launch mechanism 102, rather than rely on timing and repeatability of the launcher, to sense and monitor factors that affect energy imparted to the flying object. The sensed information (e.g., from offboard sensors 124, which at least in part may be provided to monitor mechanism 102) can be used to precisely calculate the moment the robot 110 should be released/launched from the pendulum or other launch mechanism 102. In more complex variations of system 100, the sensed information on operations of the launch mechanism 102 is fed as sensor data 131 to the onboard controller 116 (or onboard actuation system) to enable on-the-fly compensation for variations in the launch conditions, e.g., to adjust by control of the robot's components when the calculated trajectory at launch 138 does not match the target trajectory at launch 136.

In a simple implementation, the system 100 can sense height 134, which can be used to trigger release from the launch mechanism rather than on a timing basis during operations of the launch mechanism 102. More complex implementations may sense or know weight 132 of the robot 110, initial position, strain and torque on the pendulum member (e.g., wire), rate of fall, twist rate, and/or other parameters to provide more information for the release calculations (performed by the controller 116 and program 120 or by a controller operating the launch mechanism 102 when it releases the robot 110 rather than the robot 110 releasing the pendulum member or other coupling element of mechanism 102). Inflight behavior can also be adapted to take advantage of launch variations that add useful energy to the flight path/trajectory 104 such as a supportive wind in an outdoor implementation of the system 100 allowing an extra roll or flip to be performed prior to reaching the landing surface when the calculated trajectory 138 differs from target trajectory 136 in a positive way (or do one less roll/flip or move when differs in a negative way).

Flight control or in-flight motion control of a ballistic object such as robot 110 may be performed with onboard-only instrumentation such as with the control program 120 processing of sensor data 131 from onboard sensors 122. This may force the robot 110 design to include some added weight for the sensors 122 and for the computers and power sources (for controller 116) used to generate the control signals 181, 185, which may limit its effectiveness because of size, weight, and/or power considerations.

With this in mind, the inventors determined that it often will be useful to utilize a combination of onboard sensors 122 and offboard sensors 124 (which may include offboard processing and/or instrumentation in some cases). The onboard sensors 122 in such implementations may include cameras, LIDAR, infrared sensors, and the like that can sense pose 141 and speed 135 for use by the onboard actuators 180, 184, via controller 116 and control program 120, that control/change inertia, spin, and/or aerodynamic control surfaces. Range finders in sensors 122 (e.g., laser range finders, ultrasonic range finders, and the like) may be used to get position when pointing down or the like to determine the robot's current height 134. In addition, the offboard sensors/instrumentation 124 may be used that observes motion characteristics and communicates this information (as sensor data) to the onboard control system to augment the data 131 collected by onboard sensors 122.

In one useful example, an offboard generated laser sheet assembly is used in combination with onboard sensors 122 to detect laser crossings so as to accurately determine the present location of the robot 110 on its launch trajectory 104 (e.g., when break a beam the robot knows its position in air/space 103 due to use of a photosensor/photodiode in the onboard sensors 122 that detects when pass through laser plane). The offboard sensors 124 may also include a motion capture system to give accurate location information and movement information in data 131 to the robot controller 116. In another embodiment, a floodlight is provided in offboard sensors 124 that is polarized in a particular manner such that a photodiode in onboard sensors 122 can be used with a filter polarized so that the controller 116 can process its output to determine orientation when receiving light from the floodlight.

In some embodiments, in-flight controlled motions 160 are used to control in-flight movements of the robot 110 with the landing on surface 192 hidden from spectator view. This may be limiting in some cases such that some embodiments of the system 100 are configured to provide viewing of the landing trajectory 195 and impact on surface 190 because being able to land well and in a character-appropriate way adds significantly to the entertainment or show value. The landing orientation 142 and pose 140 are largely determined by the in-flight performance and, in turn, by the initial conditions at launch (including the launch trajectory 104). In addition, though, the controller 116 can implement pre-landing controlled motions 170 to set pose 172 and orientation 174 at landing on or impact with surface 192 of catching system 190. Particularly, actuation systems (in components 184 and/or inertia moving assembly 180) can continue to function just prior to landing (during landing trajectory), at the point of impact, and shortly after landing while the robot 110 is dissipating its final energy to turn, roll, and move appendages into desired positions. The control algorithms 170 implemented by control program 120 may be similar to inflight algorithms 160, but the set of forces and rapid dissipation of energy to the landing system 190 are accounted for.

In some cases, the pre-landing controlled motions/control algorithm 170 is configured to cause the robot 110 to land on a specific portion/component (or portions/components) of the body 114 such as on its back or another robust part (in a tucked or in a flat/stretched out pose with arms moved to a desired position) or with larger surface area contacting the surface 192 to distribute force. The pre-landing controlled motions 170 may provide correction by angle or by angular velocity (or both) such as by changing pose 172 (e.g., tuck during flight via motions 160 and then untuck just prior to landing as part of motions 170, stretch arms and/or other appendage out to add drag and slow the robot as part of pre-landing motions 170, and so on).

As discussed above, the launch mechanism 102 may take the form of a simple swing and/or pendulum device. In another embodiment, a whip member with a quick release may initially be coupled with the robot 110 that may be provided on the ground or a launch platform. A weight may be attached to the other end of the whip member (or another launch force applied to the whip member), and the whip member may be extended over one, two, three, or more pulleys so that a whip action is generated to launch the robot 110 with more force than can be achieved with a simple pendulum mechanism.

In another embodiment of system 100, the launch mechanism 102 provides an upper pendulum that moves at a particular speed back and forth while the robot 110 itself acts as the lower pendulum swinging according to pre-launch controlled motions 150 (e.g., the robot has a generally linear or elongated body 114). The motions 150 can set the pose 152 and orientations 154 at launch on trajectory 104 such as to set the offset angle and/or to get more rotation of the robot 110. Alternatively, the motions 150 can move the robot 110 to get a second oscillation (of the lower pendulum made up of the robot 110) so as to "pump" energy into the lower pendulum and generate a launch with more energy (a higher or faster projectile so changes trajectory 104 achievable without movement of robot 110).

The inflight controlled motions 160 may include changes in pose 162 and/or orientation 164 to achieve one or more desired moves or stunts prior to landing on surface 192. For example, the motions 160 may be chosen to change the moment of inertia of the robot body 114 such as by causing the robot's actuatable components (joint with an actuator or the like) to operate to cause the body to move from an untucked pose into a tuck pose to have less inertia so as to increase the rate of spin 112 (or increase angular velocity) (or vice versa). In another motion 160, the robot's body 114 may simply be actuated to fold and unfold. In yet another exemplary in-flight controlled motion 160 an actuatable component 184 (such as an arm) may be moved to misalign the body 114 with angular momentum to add spin and/or cause flipping during the flight.

With the system 100 and its operations in mind, it may be useful at this point in the description to describe a specific implementation of a ballistic robot system using a specific, but not limiting, embodiment of the robot 110. It was recognized that human performers have developed impressive acrobatic techniques over thousands of years of practicing the gymnastic arts. At the same time, robots have started to become more mobile and autonomous, and the inventors recognized that a robot can be made to imitate the acrobatic techniques or stunts performed by humans in dramatic and informative ways. The following description presents a simple two degree of freedom (DOF) robot that uses a gravity-driven pendulum launch and produces a variety of somersaulting stunts prior to landing. The robot uses outputs of an IMU and a laser range finder (both onboard) to estimate its state mid-flight and actuates onboard components to change its motion both on and off the pendulum-based launch mechanism (e.g., as pre-flight actuated or controlled motions and in-flight controlled or actuated motions). The dynamics of the robot's behavior are also described in detail in a framework of acrobatic capability with support for the new system provided with documentation of experimental results.

With regard to quantifying acrobatic performance and an acrobatic robot for use as a ballistic body or projectile, it may be helpful to define some basic metrics by which to measure the performance of a given design. Number of spins or rotations about a given body axis may be one useful figure of merit as this is the main way aerial stunts are categorized in diving and gymnastics. Peak height and total horizontal distance covered are also interesting measures of any ballistic flight as they both give a sense of the scale of the motion. In the following discussion, horizontal distance is utilized because the indoor location of the inventors test rig put a practical limit on peak height.

In addition to the broad capabilities mentioned above, an acrobatic ballistic robot can also be judged by the precision with which it lands, both in terms of final location and final orientation. These capabilities can be thought of as shared between the robot's launching apparatus (e.g., pre-flight controlled motions combined with launch mechanism functionality) and the robot's ability to affect motion during flight. A jumping robot carries its launching apparatus onboard, and a flying or powered-flight robot uses aerodynamics to significantly change the trajectory of its center of mass during flight.

In contrast, the inventors' approach in designing a ballistic robot system uses a separate launching system and minimizes aerodynamic effects. This means that the final location (where the landing surface of the catching system will be located in the ballistic robot system) is nearly purely a function of launch conditions (initial trajectory), if we define the launch as being the point at which the ballistic robot (called "Stickman" interchangeably with ballistic robot due to its configuration to provide 2 DOF) releases from the pendulum of the ballistic launch mechanism. The final orientation, and the amount of rotation (in a vertical plane) preceding that final state (at landing), is a function both of the angular momentum and initial angle (or launch angle) provided by the launch and the ability of the ballistic robot to change its angular velocity during flight. In the following description, several capabilities of the system and its robot are shown including: (a) performing zero, one, and two flips in-flight; (b) throwing the robot between 5 and 10 meters horizontally away from the pivot of the pendulum of the launch mechanism; (c) controlling the landing location within a standard deviation of 0.3 meters; and (d) controlling the landing orientation within a standard deviation of 30 degrees.

Figure 2:
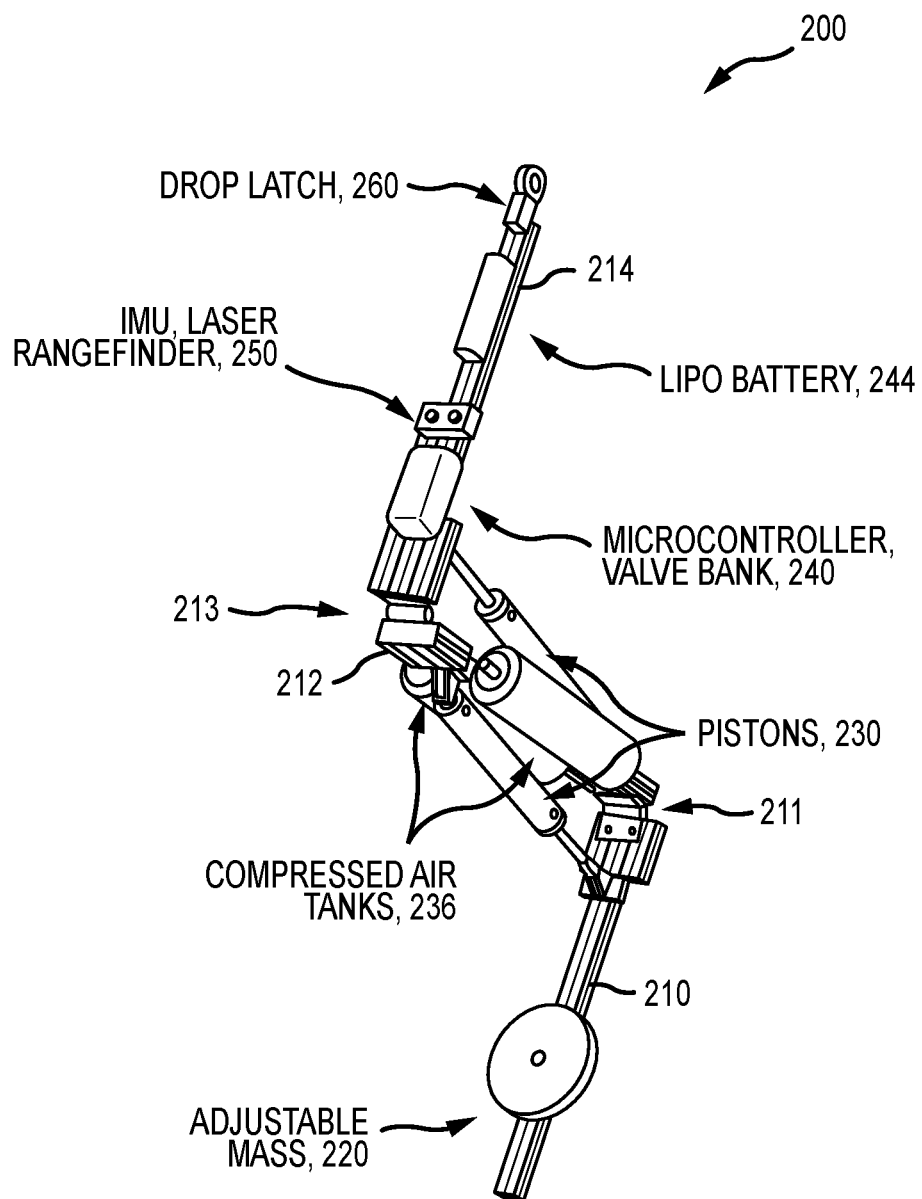
FIG. 2 is a side perspective view of a robot for use in a ballistic robot system of the present description.
Figures 3A, 3B, 3C:
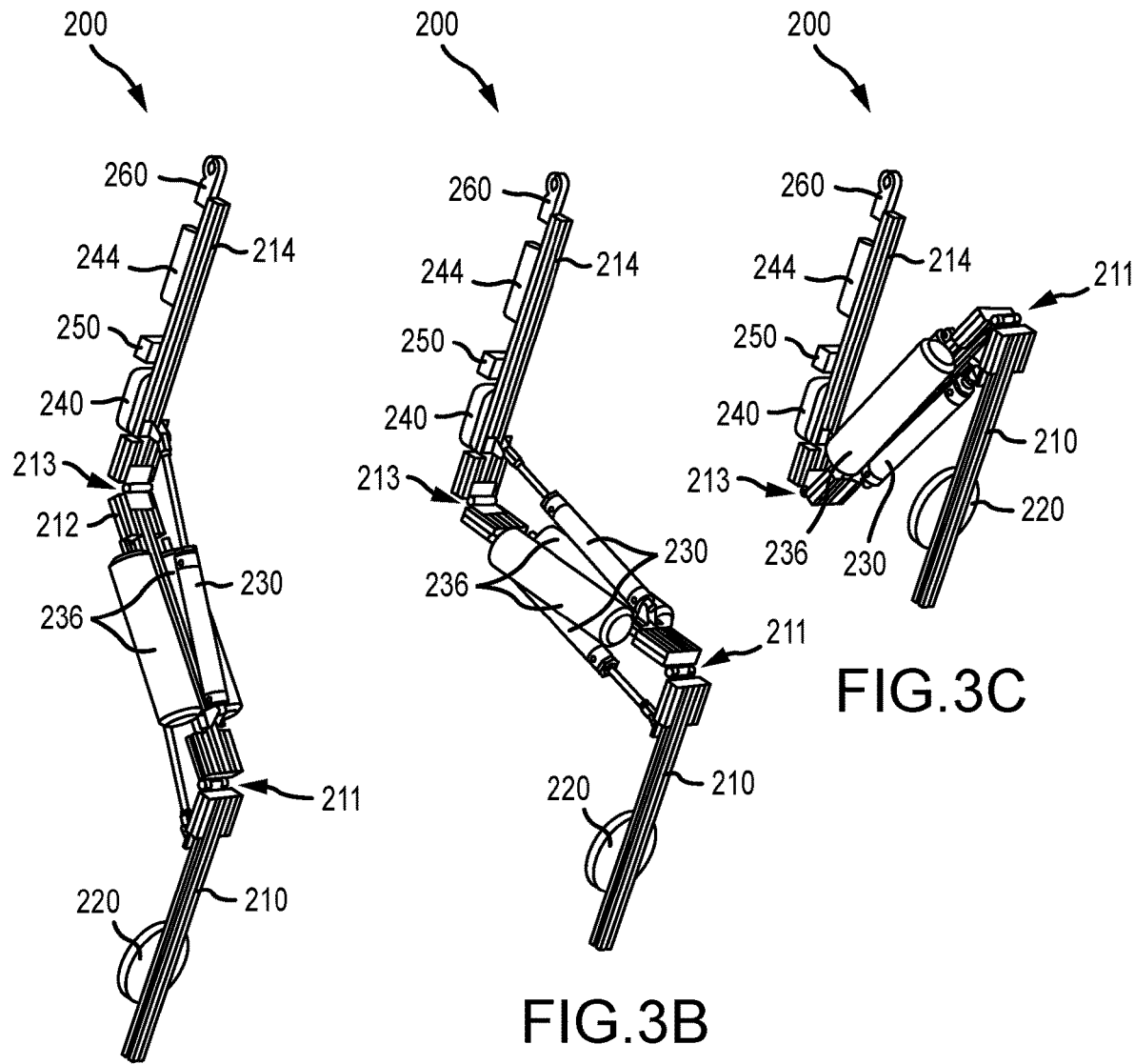
FIGS. 3A-3C show side views of the robot of FIG. 2 in three operating modes (or after three controlled motions) for use in a ballistic flight to perform an aerial stunt (e.g., flips/summersaults and a desired pose and orientation a landing)

FIG. 2 is a side perspective view of a robot 200 for use in a ballistic robot system of the present description, such as human-length (e.g., about 7 feet) acrobatic robot. FIGS. 3A-3C show side views of the robot 200 of FIG. 2 in three operating states for use in a ballistic flight to perform an aerial stunt (e.g., flips/summersaults and a desired pose and orientation at landing), and, specifically, FIG. 3A shows the robot 200 as it initiates movements to move into a tucked configuration, FIG. 3B shows the robot 200 as it continues to perform a tuck, and FIG. 3C shows the robot as it completes the controlled motion(s) to move into a full tuck or fully tucked configuration.

The robot 200 (or "Stickman") includes three elongate links 210, 212, 214 interconnected at/by two joints 211, 213. The robot 200 includes an adjustable mass 220 (adjustable position) on the lower link 210. Two actuators 230 in the form of pistons are coupled at their ends to two adjacent links (i.e., links 210 and 212 and links 212 and 214), and these are energized or powered with release of gas from compressed air tanks 236 affixed to (or part of) middle or intermediate link 212. The robot 200 includes a controller 240 in the form of a microcontroller (with appropriate software) operating a valve bank to selectively release air from tanks 236 to fire each piston/actuator 230 to cause the robot 200 to perform controlled motions (e.g., pre-flight, in-flight, and pre-landing as discussed above with reference to FIG. 1). A power source 244 in the form of a battery is mounted on (or part of) the upper link 214 to power the controller 240 and a set of onboard sensors 250 (e.g., an IMU and a rangefinder 250 (which may take the form of three laser rangefinders (leading, center, and trailing rangefinders) offset by some angle such as 12.5 degrees)) that operate to provide sensor data to the controller 240 for use in timing or triggering the actuators 230 to provide controlled motions of the robot 200. Additionally, the robot 200 includes a drop latch 260 (that may be servo-driven quick release latch coupled to a loop at the end of the pendulum cable/member) that can be used to couple the robot 200 to a launch mechanism (e.g., a pendulum or swing) and to later be actuated/operated by the controller 240 to release the robot 200 as a projectile or ballistic body on a trajectory or flight path.

In one prototype, the robot 200 was fabricated with three aluminum links 210, 212, 214 connected by hinges 211, 213, which allow the body of the robot 200 to transition from a collapsed "Z" or tucked configuration to an approximately planar or straight line configuration (fully untucked configuration) as shown in FIGS. 3A-3C. When untucked, the prototype robot 200 was designed to be 7 feet tall to approximate the height of a human stunt performer with their arms raised over their head. Air tanks 236 stored the energy used for actuation, and a 12 volt lithium polymer (or Lipo) battery pack powers the solenoid valves 240 controlling the actuators 230.

The basic construction of the prototype robot 200 was influenced by a desire for easy reconfigurability, fast repair, and high peak actuator strength and power. T-slot aluminum extrusion was used for links 210, 212, and 214 to allow for reconfigurability of various components based on incremental findings. Both ends of the air pistons 230 can be adjusted along the length of their links 210 and 212 or 212 and 214, allowing changes in torque profiles. A large extra weight 220 can be added to the top or bottom link 214 or 210 in order to adjust the robot's center of mass location and change in moment of inertia. Pneumatic actuators 230 were chosen in the prototype for their high power density and were actuated with solenoid valves that are triggered by an Arduino Micro controller board (both of which make up the controller 240 in this example robot 200). The upper or top link 214 is outfitted with both a LIDAR-Lite v3 laser rangefinder and a 6-axis Invensense ICM 20602 inertial measurement unit (IMU), which are the onboard sensors that provide the main inputs to the robot's controller 240.

Figure 4:
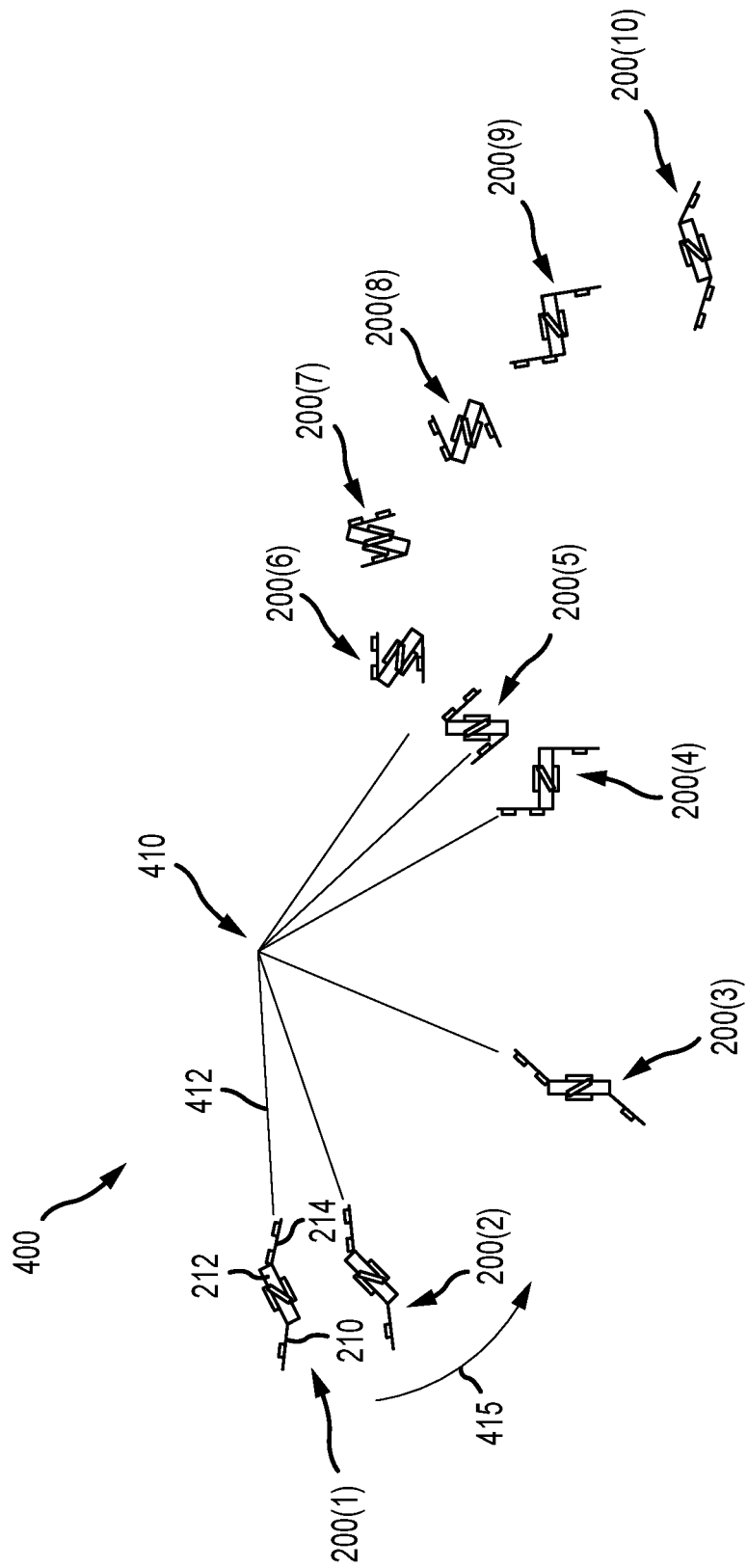
FIG. 4 is a side view of a ballistic flight system of the present description (e.g., an implementation of the system of FIG. 1) using the robot of FIG. 2 and during its use showing multiple positions of the ballistic robot.

FIG. 4 illustrates a ballistic robot system 400 of the present description used to launch the robot 200 as a ballistic body or projectile on a trajectory/flight path toward a landing surface (not shown). The robot 200 is shown in operating states 200(1)-200(10) as it progresses from an initial state 200(1) to a landing state 200(10) to perform a somersault stunt. In initial state, the robot 200(1) is in an untucked or linear/planar configuration (or is fully extended) and is attached to an end of a rigid pendulum member 412 of a pendulum-type launch assembly 410, and the robot 200(1) is raised to a desired initial height (e.g., about 6 meters above the ground/landing surface height in one test of the prototype system 400), which sets potential energy and the initial angle effects second order pendulum amplitude and phase.

Upon release from this initial position, the robot 200(2) begins to swing/move in an arc as shown with arrow 415 downward under the force of gravity. The robot 200(3) uses its IMU to monitor first and second order pendulum response. Then, the robot 200(4) begins to tuck (e.g., at a predetermined time), with time of tuck before release providing a tradeoff between rotational and translational energy. The robot 200(5) has completed the tuck and releases itself (e.g., at a second predetermined time in some examples) via the drop latch from the end of cable/pendulum member 412, with release timing providing a tradeoff between horizontal and vertical translational energy. The robot 200(6) and 200(7) then attempts to estimate its height and velocity to calculate time remaining in the air (with processing of sensor data by the controller and its control program). The robot 200(6) is a state shortly after release in which laser rangefinders are pointed vertically, and the IMU corrects angle, with the controller calculating distance from the ground/height and velocity assuming a large flat surface/ground.

The robot 200(8) is now falling or is in pre-landing stages of the trajectory in which angular velocity and remaining time of flight or in the air are calculated by the controller. Untucking of the robot 200(9) is begun and rotation slows, and untucking is completed (or full extension) just prior to landing for the robot 200(10). Untucking is timed to provide an optimal landing angle/orientation and pose (e.g., to distribute braking forces and/or to simulate landing by a live acrobat). When the robot 200(8) predicts that untucking will result in the correct landing orientation (as shown for robot 200(10)), the controller of the robot commands an untuck controlled motion (e.g., a firing of one or more actuators) and lands relatively gently on its back on a foam mat or other landing surface of a catching assembly (not shown in FIG. 4 but understood from FIG. 1).

As shown in system 400, a gravity-driven pendulum 410 can be used to launch Stickman 200. By raising the robot 200(1) nearly to the ceiling or to a desired initial height, the launch assembly 410 is able to inject significant energy into the launch (shown for robot 200(6)). The long swing shown with arrow 415 spreads out this acceleration over a large distance, making for relatively gentle accelerations. Further-more, the long swing increases the length of time when the robot 200 is performing in a visually compelling way. The joint (latch 260) attaching the robot 200 to the pendulum arm/member 412 can have a stiffness ranging from the theoretical extremes of zero (a pin joint) to infinity (a rigid link). A rigid joint would turn the whole system into a simple compound pendulum with very predictable behavior, likely increasing the repeatability of landing position. However, this also constrains angular velocity to be a function of linear velocity, limiting the range of somersault ability. A pin joint creates a double pendulum, a chaotic system with high sensitivity to initial conditions. As a result, however, it is possible to decouple angular velocity from linear velocity and produce a larger range of launch conditions in system 400. Although not shown in FIG. 4, an Optitrack motion capture system (a type of offboard sensor) was used during prototype testing in system 400 to provide reference position data of the robot 200(1)-200(10).

Figure 5:
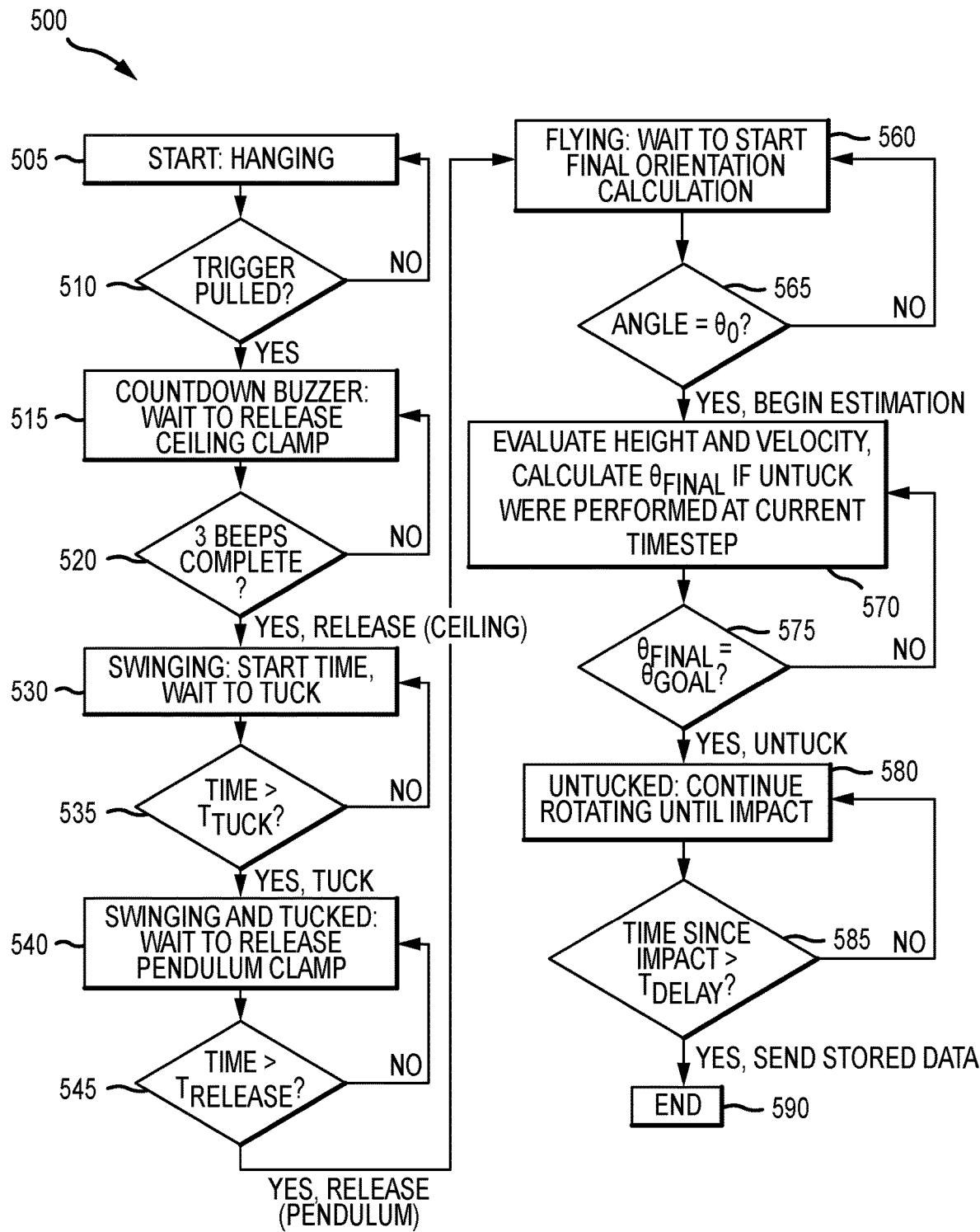
FIG. 5 is a flow diagram of a control method (or algorithm) for a ballistic robot to perform a predefined stunt and land with a target orientation and pose.

FIG. 5 illustrates a flow diagram 500 (or logical flow of the robot's control scheme implemented by its controller and executed code) for a method of operating the robot or Stickman to perform the stunt shown in FIG. 4. At 505, the robot is placed in the initial position hanging from the end of the pendulum arm via its coupling member (e.g., drop latch 260). Step 510 verifies whether or not an initiation button or trigger has been operated/pulled to start launch. When trigger signal is received at 510, the method 500 continues at 515 with starting a countdown of a waiting period to start launch, and step 520 verifies when the countdown is complete. When complete, the method 500 activates the release/dropping of the pendulum member to which the robot is coupled at one end.

Step 530 starts an onboard clock with the start time and retrieves the predefined tuck initiation time. Then, at step 535, the method 500 continues with determining when the swing time exceeds the time to initiate the tuck motion. When exceeded, the controller initiates the tuck motion (e.g., move the robot into a tucked configuration). At 540, the controller starts another clock to measure the amount of time the robot is swinging in the tucked configuration and retrieving a time for initiating release from the pendulum member. At 545, the controller determines when the tucked and swinging time exceeds the time for release and when it does, the controller releases the robot from the pendulum member (e.g., by activating the drop latch).

In step 560, the robot's controller maintains the robot in the tucked configuration and waits to start the final orientation calculation (to achieve a target orientation and pose at landing). In step 565, the controller acts to determine when the present angle indicates the robot is beginning to fall or to enter the pre-landing stage of the trajectory. When this occurs, the method 500 continues with beginning estimation by evaluating at 570 the height and velocity and by calculating the final orientation if untuck were performed at the current time step. If not the target orientation at 575, the evaluation step 570 is repeated. When it is estimated that untucking will achieve the target orientation at a present time step, the method 500 continues with the controller triggering the untuck motion and then at 580 the robot remains untucked or fully extended and rotates until impact. The method 500 may continue at 585 with determining when a time since impact/landing has exceeded some predefined delay period and when it does, the stored data can be transmitted to a tracking/prototype evaluation system. Then, the method 500 can end at 590 such as with resetting for a next launch with performing step 505.

Figure 6:
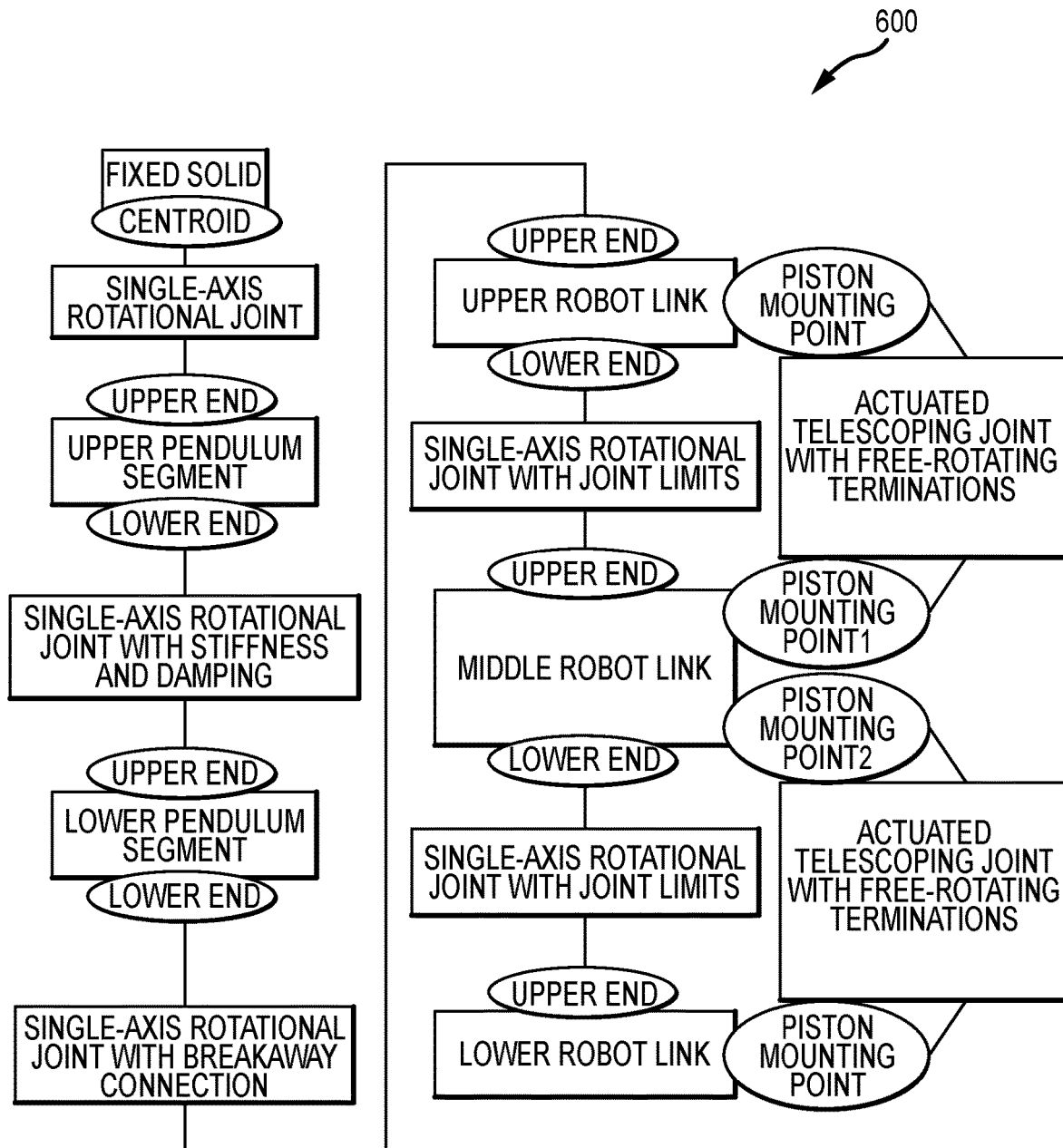
FIG. 6 is a schematic view of physical elements of the robot and pendulum launch mechanism combination showing joints and rigid body elements.

At this point in the description, it may be useful to provide a discussion of the dynamics of the ballistic robot. With regard to swinging dynamics (on the pendulum), the double pendulum is the classic example of a chaotic system, and it becomes only more complicated when the possibility of tucking the robot/lower pendulum is introduced as discussed above. To evaluate this complexity and the range of capabilities of the ballistic robot system 400, the inventors created a detailed model using Matlab's Simscape Multibody toolbox. The model included a two-link pendulum (a stiff torsional spring connects the top half of the pendulum to the bottom half to help approximate the first oscillatory mode of the beam), three rigid bodies for the robot, and two massless telescoping actuators to simulate the pistons as shown in the diagram 600 of FIG. 6.

Figure 7:
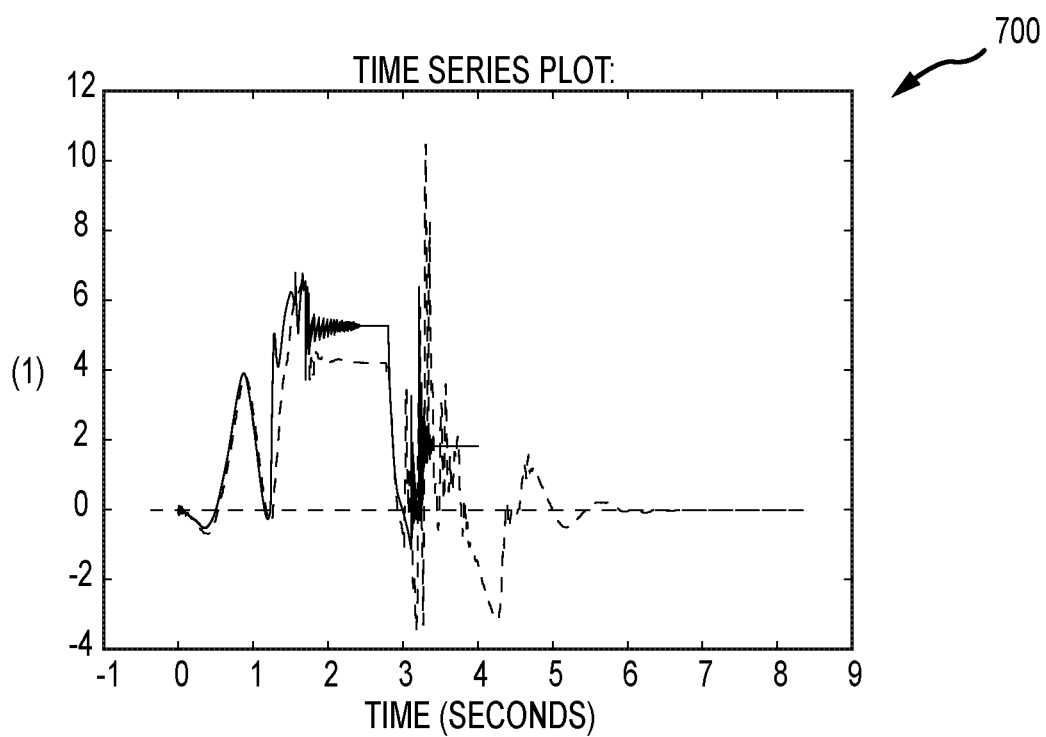
FIG. 7 is a graph showing a model versus experiment results for a typical somersault animation.
Figure 8:
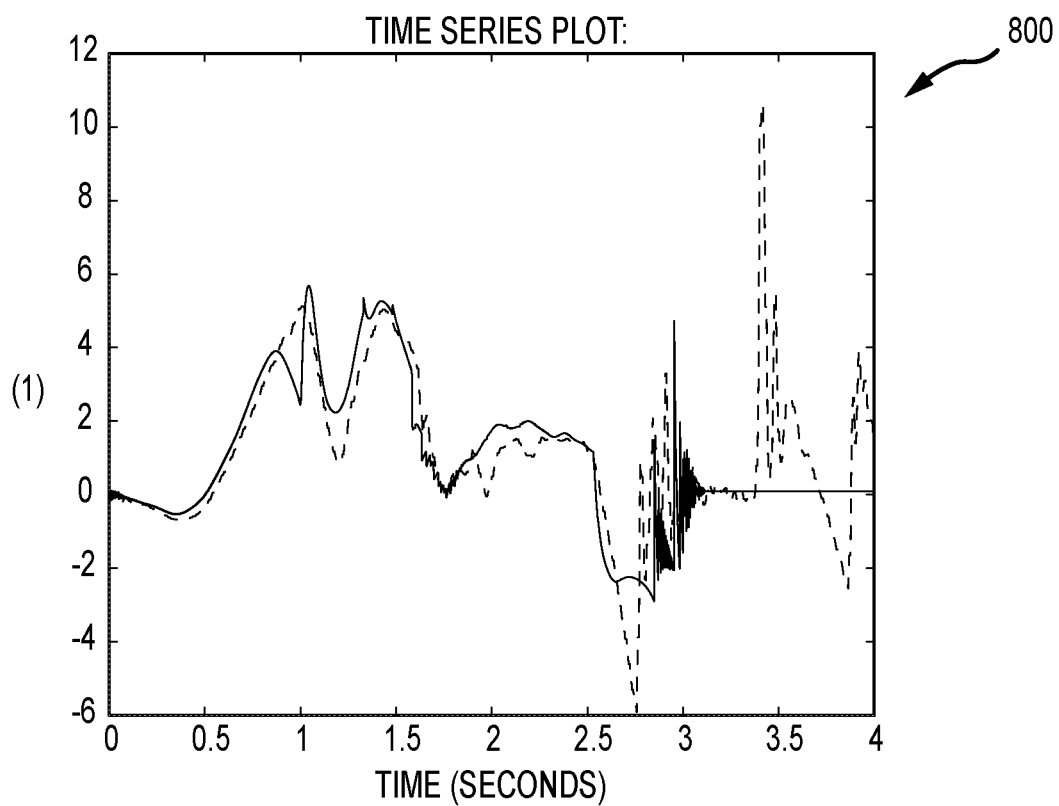
FIG. 8 is a graph showing a model versus experiment results for an early tuck and a late release head plant.

The inventors believe that the model (shown in schematic diagram 600 of FIG. 6) captures the general behavior of the system well enough that it is a useful tool for understanding the capabilities and limitations of the ballistic robot system 400. FIG. 7 provides a graph 700 showing a model versus experiment results for a typical somersault animation, and FIG. 8 provides a graph 800 showing a model versus experiment results for an early tuck and a late release headplant. In the graphs 700 and 800, the dashed lines represent simulated angular velocity while the solid lines represent actual angular velocity as measured by the onboard gyroscope provided as part of the onboard sensors 250 of the robot 200.

With regard to mid-air or inflight dynamics, the physics of motion are relatively simple for a ballistic robot. If the principle moment of inertia is closely aligned with the angular momentum vector, then it can be stated:

$$L = I\omega \qquad \text{Eq. (1)}$$

Where I is the moment of inertia around the axis of rotation and $\omega$ is the angular velocity.

If the moment of inertia changes from $I_1$ to $I_2$, the change in velocity is given by:

$$\omega_{new} = \frac{I_1}{I_2} \omega_{old}. \qquad \text{Eq. (2)}$$

This is simplest if the change in inertia from one state to another is smooth, fast, and monotonic and if the angular velocity is in good alignment with the desired axis of rotation. In practice, the inventors found that tucking a little before release helped slow or eliminate twist. The pneumatic cylinders used provided a fast transition but are underdamped and create a strong ringing effect, which makes accurate measurement and simulation of this stage more difficult. If one were to disregard this ringing effect, the result of untucking can be characterized by an average angular velocity before, during, and after the untuck event. This analysis can be modified due to the fact that the untuck event changes the relative angles of each body segment, so a constant angular displacement, $\theta_{offset}$, can be added to the result.

Using the onboard accelerometer, the onboard laser rangefinder, and a model of expected dynamics, the amount of time left in the air, $T_a$, can be estimated based on the estimate of height and vertical velocity at a given time, $t_0$:

$$T_a = \frac{v_0}{g} \sqrt{\left(\frac{v_0}{g}\right)^2 + \frac{2h_0}{g}} \qquad \text{Eq. (3)}$$

where $h_0$ is the estimated height at time $t_0$, $v_0$ is the estimated vertical component of velocity at time $t_0$, and g is acceleration due to gravity.

The following formula can be used to estimate the final orientation, $\theta_{final}$, if the release were to be commanded immediately:

$$\theta_{final} = \theta + \theta_{offset} + \omega R_t T_t + \omega R_f (T_a - (t-t_0) - T_t) \quad \text{Eq. (4)}$$

where θ is the current estimated angle, $\theta_{offset}$ is the expected displacement due to re-configuration of limbs, ω is the current angular velocity, $R_t$ is the predicted ratio between the current angular velocity and the average angular velocity during the transition, $T_t$ is the predicted time for the transition, $R_f$ is the predicted ratio between the current and final angular velocities, t is the current time, and to is the time at which $T_a$ was last estimated.

With regard to predicted capabilities, launching capability, in terms of the number of possible somersaults and the range of possible landing locations, is constrained by the total available energy of the system. For the Stickman robot design shown at 200 in FIG. 2, the energy stored in the air tanks is about an order of magnitude less than the energy stored in potential energy at the beginning of the swing. The main determinant of capability, then, is the way that energy can be allocated between linear and angular momentum in each axis. For the majority of the following analysis, it is assumed that tucking occurs only after the robot has been released from the pendulum (after launch). In Stickman's pendulum-based launch, the relationship between linear and angular momentum is constrained by rigid body kinematics. Only those velocities which maintain the absolute lengths of the two pendulum links are allowed.

Figure 9:
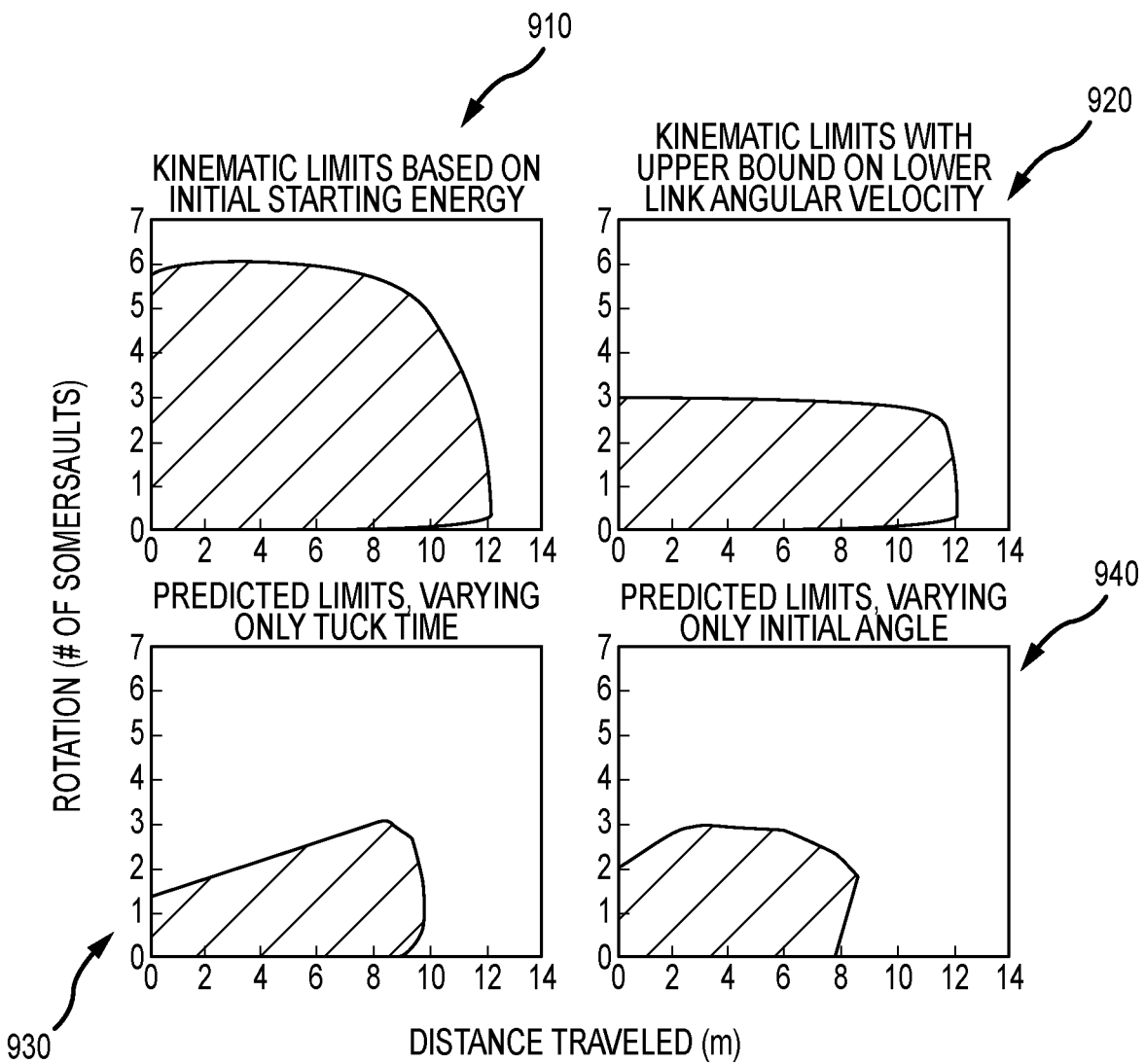
FIG. 9 provides graphs showing reachable states with various constraints.

Numerically simulating the full range of kinematically possible velocity configurations gives us an upper bound on what combinations of angular and linear velocities are possible given the experimental setup used to test the prototype ballistic robot system. These velocities can then be used to calculate the final position and total rotation of the robot as shown with graphs 910, 920, 930, and 940 of FIG. 9 showing reachable states with various constraints, with graph 910 showing kinematic and energetic possibility, with graph 920 showing kinematic possibility given a maximum second link amplitude, with graph 930 showing full simulation sweep over different tuck times, and with graph 940 showing full simulation sweep over different initial angles.

This broad range of possible outcomes is slightly misleading as it includes situations that are kinematically possible but practically infeasible. To get a more reasonable estimate of total capability, the angular velocity of the second link can be limited to prevent it from exceeding 180 degrees in amplitude under typical loading conditions. The previous kinematic analysis can then be taken and any results can be discarded that result in an angular velocity greater than this value, which produces the graph 920 of FIG. 9. This theoretical limit then becomes a way of measuring the capability of a proposed control scheme while the robot is on the pendulum (launch mechanism). If the area of possible states covered by a proposed method covers a significant percentage of the theoretical limits, one can be confident that the robotic capability is likely not being artificially limited by the control approach.

Two potential control methods can now be explored and compared using the full dynamic model of the Stickman ballistic robot design. The first method is to simply change the initial angle of the robot while satisfying the constraint that no part of the robot is allowed to penetrate a ceiling or surface above the pendulum/launch mechanism. The results of this control method over varying release times are illustrated in the graph 930 of FIG. 9. The second method of control explored was to begin the tuck while still on the pendulum (as shown in FIG. 4). This changes the length and inertia of the ballistic robot, thus changing the frequency of the second-order pendulum behavior and changing the relative phase of angular and linear momentum. The results of this control method are shown in the graph 940 of FIG. 9.

Once in the air (after launch), the robot has a fixed amount of angular momentum available and a fixed amount of time before the ballistic trajectory impacts the ground. The mid-air trajectory of the robot can be measured by how much it is able to change its final angle given an initial angular momentum. In the case of the Stickman robot 200, the ratio between tucked and untucked moments of inertia is about 1 to 3, which means that for a flight that can produce two thirds of a somersault in the untucked position, the robot can achieve an actual number of rotations between that two thirds of a rotation and two full rotations.

To review the results of prototyping testing, the Stickman/robot 200 was able in the system 400 to achieve total flight distances ranging from 5 to 11 meters. No serious effort was made to control final position run-to-run, but a typical animation showed a standard deviation in landing position of about 20 centimeters for five trials. Based on a combination of modeling and iterative refinement, the Stickman/robot 200 achieved three distinct rotation profiles: zero, one, and two backflips. Image sequences of these three different animations were captured during prototyping. Simulations also predicted the ability to perform half of a forward flip if a large enough initial angle was used. Tests pursuing this goal (stunt/move) achieved the angular velocity necessary while still on the pendulum, but excessive loading on the latch caused a jamming effect that prevented the robot from releasing at the correct time, which can be resolved in future designs of the system 400 and/or robot 200.

Figure 10:
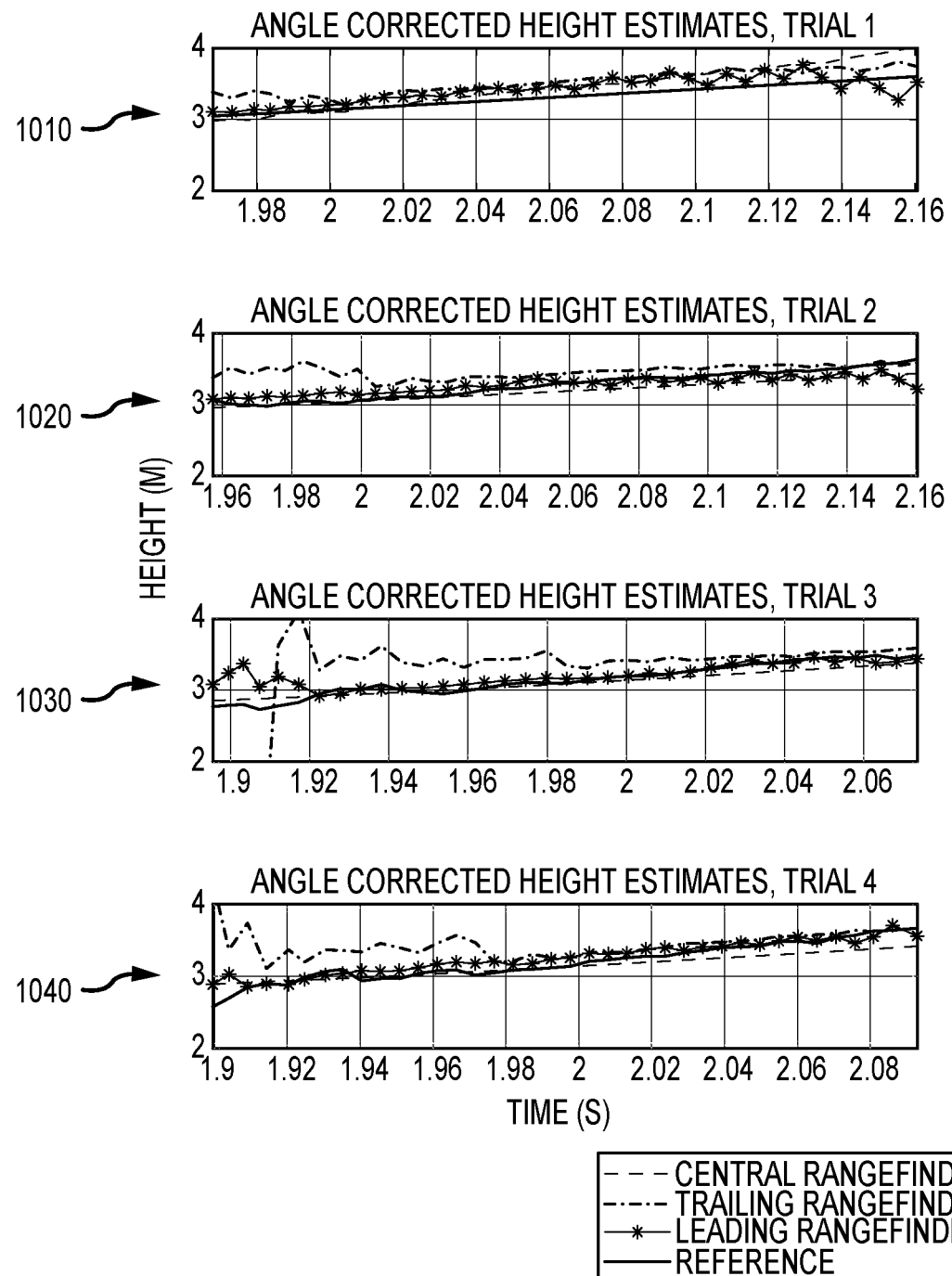
FIG. 10 provides graphs of results of comparisons of height estimates using angle corrected laser rangefinder readings.
Figure 11:
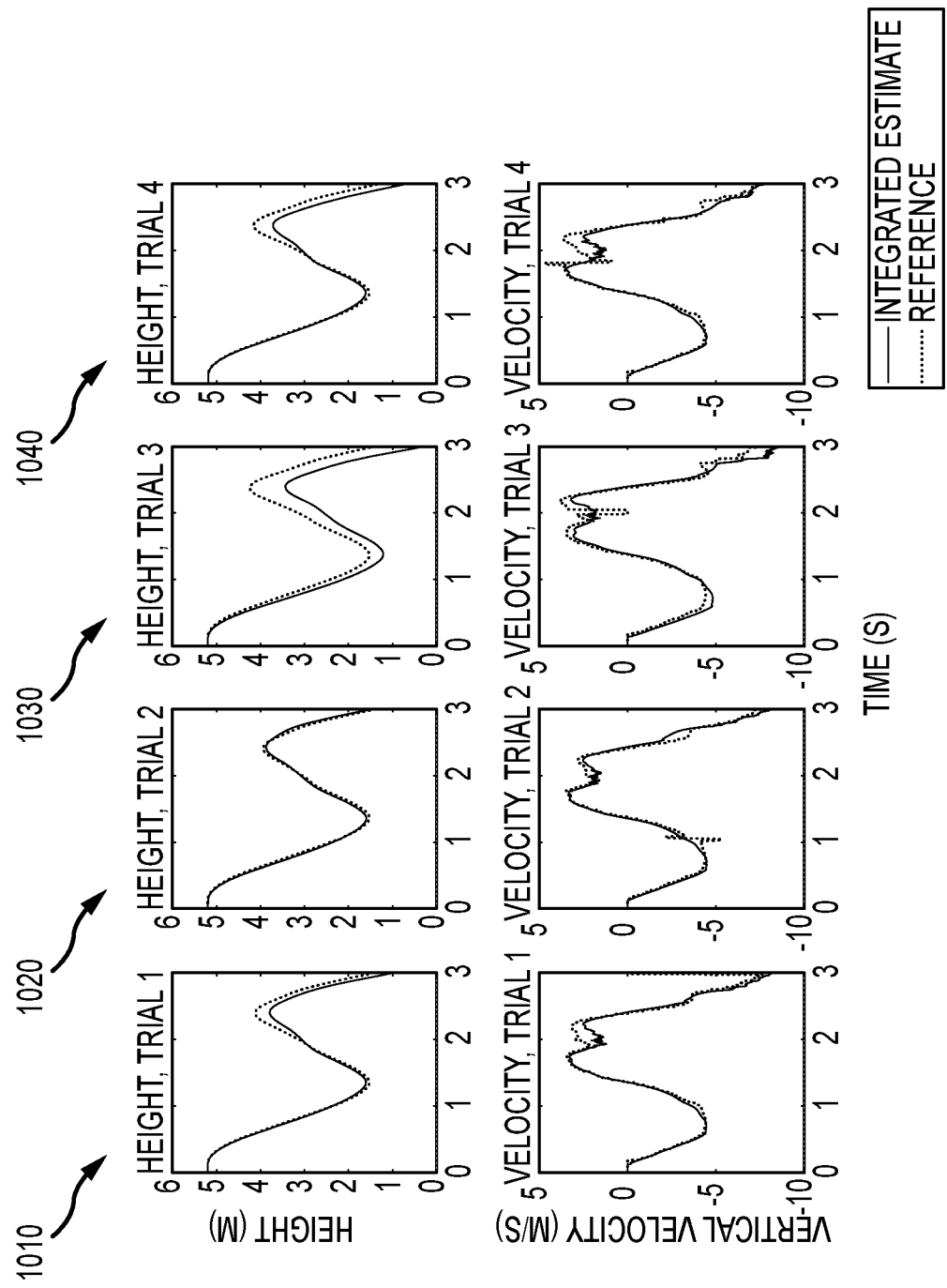
FIG. 11 is a set of graphs of comparisons of height and velocity estimation using integrated vertical acceleration (note, the discrepancy beginning around the time of release (t=1.6) for runs 1, 2, and 4)

One simple control law was used by the inventors to attempt to ensure that the robot landed in gross alignment with the mat/landing surface. Using a naïve estimate of the difference between distance measurements over the last ten trials, the robot was operated to attempt to calculate time left in the air and adapt to its measured angular velocity and estimated flight time. The robot uses the angle estimate from the IMU to correct for the angle at which the laser rangefinders collect a particular reading. Resulting height estimates were compared to the ground truth from the motion capture system with results shown in graphs 1010, 1020, 1030, and 1040 of FIG. 10.

During testing, the robot landed with an average angular error of 27 degrees of over-rotation and with a standard deviation of 28 degrees. Position and velocity can also be estimated by using the IMU to estimate vertical acceleration. This was found to work well on the pendulum, but it encountered a discontinuity around the time of release, with results shown in graphs 1010, 1020, 1030, and 1040 of FIG. 10. In future work, the inventors intend to investigate fusing the information from the IMU and the laser rangefinder to achieve a better estimate of height and velocity, allowing the accuracy of the final angle control to be improved.

The ballistic robot design shown with the robot/Stickman 200 is useful for emulating the behavior of human performers even using a limited set of sensing and actuation capabilities. It is able to successfully perform several different somersaulting stunts by changing initial orientation and the timing of controlled moves (or changes in pose) including tuck, release, and untuck. The onboard sensors were able to track the angle, height, and velocity of the robot during and after launch. More advanced sensing and control strategies are envisioned (as discussed above with reference to FIG. 1, for example) that will increase the repeatability of the robot.

As the robot design progresses towards more interesting stunts, it may be useful to provide more actuatable components on its body and/or more DOF to allow control in other axes of rotation and to allow control of position as well. This effort will be facilitated by ongoing efforts in refining the simulation of the robot and attempting to develop simplified models that provide more intuition for the behavior of the system, and it should be clear from this description that even early models and prototypes of the robot and ballistic robot system, based on observing the robot's angular momentum instead of its angular velocity, appear promising.

FIG. 2 provides one useful robot 200 for use in a ballistic robot system of the present description, such as human-length (e.g., about 7 feet) acrobatic robot, but it will be understood by those skilled in the art that the robot 110 (and other components) of the ballistic robot system 100 of FIG. 1 may be implemented with other robot designs and/or embodiments. With this in mind, the inventors designed, built, and tested/prototyped an "acrobot" or mini-man actuatable ballistic figure with a configuration differing from robot 200, and the following discussion describes this robot or acrobat and provides results of analysis/testing of this additional design. The acrobot design was designed to achieve the following goals: (a) create back flips/front flips using pumping; (b) do a flip with a twist one way and then the other way; (c) accurately predict time in the air; and (d) control twist.

Figure 15:
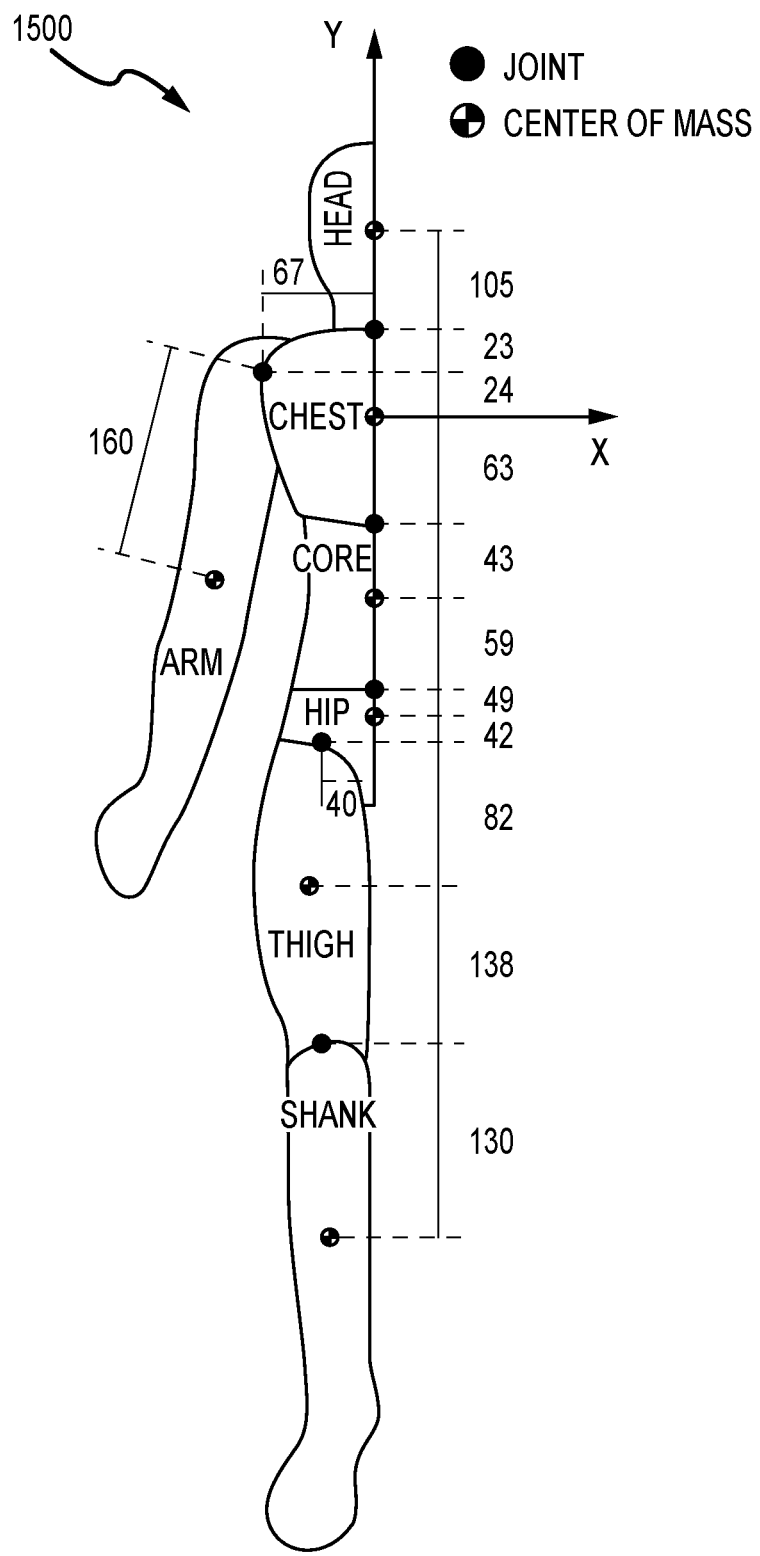
FIG. 15 provides a detailed schematic of another embodiment of a ballistic robot or acrobot showing component masses.

With regard to ballistic robot design and experimental setup, to being the exploration of acrobatic motion, the inventors built a 9 DOF half-scale humanoid robot that they called an "acrobot." The robot's joints were located at the neck, each shoulder, each hip, each knee, and at two points in the torso, as shown for the robot 1500 provided in FIG. 15. Each joint is directly driven by one or two actuators (e.g., Dynamixel™ servos or the like), which provides absolute encoder information as well as current and torque sensing, with the neck having one servo, each shoulder having one servo, with the upper core having two servos, with the lower core having two servos, with the hips having one servo each, and with the knees each having one servo. The robot also has a "hand" servo at the extent of each arm, which does not drive a joint but instead controls the release mechanism for the launch cable interface.

The acrobot/ballistic robot carried two onboard microprocessors, e.g., an Adafruit Feather HUZZAH with ESP8266 for communication and storage of presets and a Teensy 3.6 for polling and storing sensor data and performing calculations. The robot was equipped with two inertial measurement units, which may be the VN 100 and the VN 110 produced by Vector-Nav™ or the like. The processors and sensors were mounted to the back of the chest segment, adjacent to three reflective markers used for motion capture. The servos were covered in pieces of a hollowed-out humanoid mold such as one made out of foam (e.g., BJB Enterprises TC-296 urethane foam or the like). This was then covered in a suit made of spandex. The ballistic robot was also equipped with an LED belt to visually indicate events in the control firmware. The arms of the robot were bent in towards the centerline of the figure to facilitate grasping the launch mechanism. The hips were slightly splayed to allow the legs to move in both the sagittal and the lateral plane to allow for more direct control of yaw in both planes.

Figure 12:
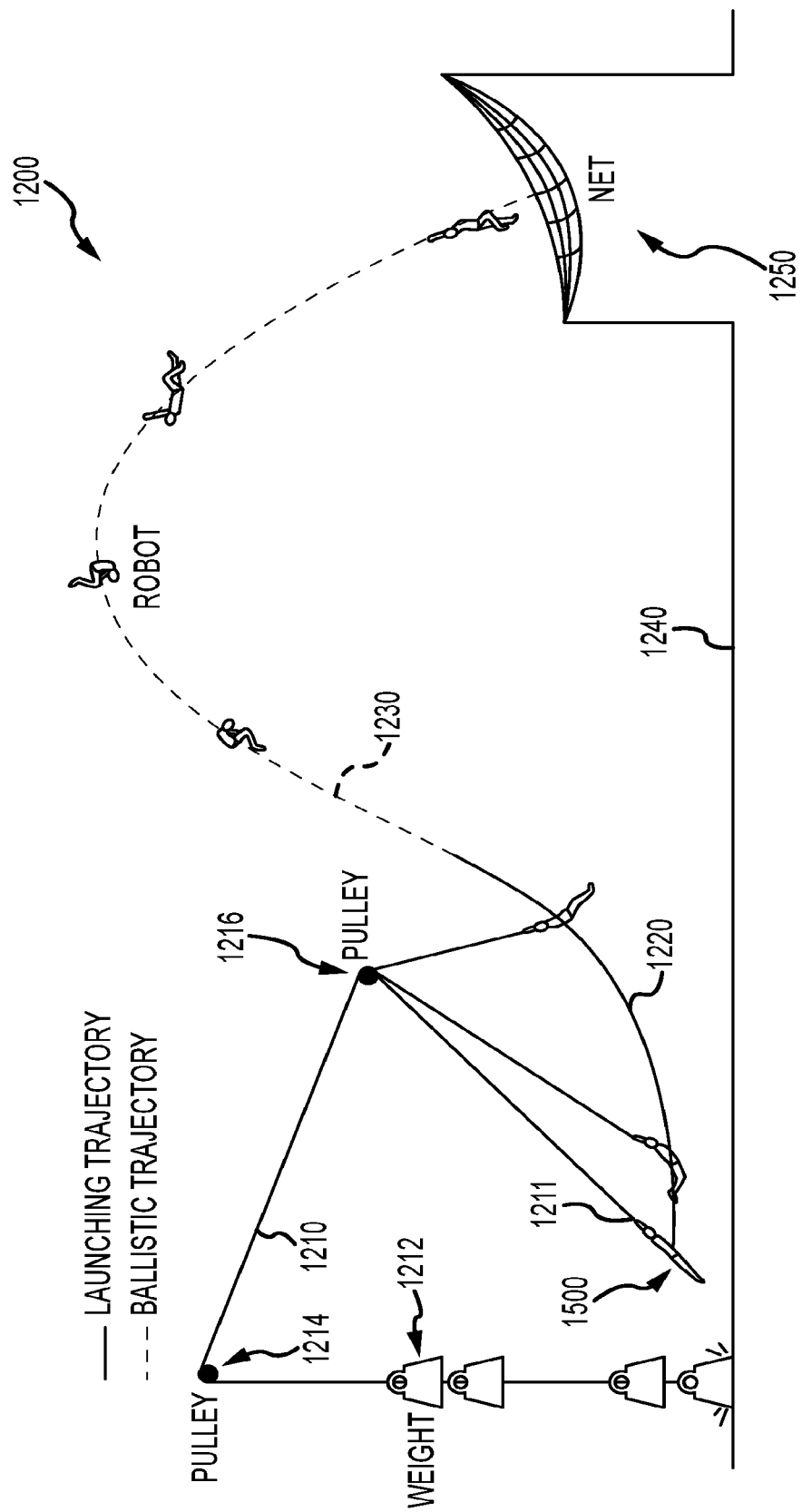
FIG. 12 is a diagram of an experimental setup or system for a ballistic robot of the present description.

As an overview of the experimental setup employed, the basic experimental setup or system 1200 is shown in FIG. 12. As shown, the robot 1500 is attached by its feet to a ground station on ground/support 1240 and by its hands to an end 1211 of a cable system 1210, which is routed through pulleys 1214 and 1216 to a counterweight 1212. Upon release from the ground station on the ground/support 1240, the robot 1500 is propelled forwards and upwards along a launching trajectory or path 1220 until it releases from the end 1211 of the cable system 1210. The robot 1500 then follows a ballistic trajectory or aerial flight path 1230 during which the robot 1500 is controlled/operated to change its pose to achieve desired performance criteria and reach the desired landing configuration. The ballistic trajectory 1230 terminates in a catchment net 1250 that decelerates the robot 1500.

The counterweighted launch provides a relatively gentle acceleration over a long distance, allowing the robot 1500 to be safely and repeatedly launched. This closely imitates a trapeze launch but with the additional energy boost allowing the robot 1500 to be sent from a launch site on the floor 1240 to a significant height (e.g., nearly to a ceiling not shown in FIG. 12), which gives the robot 1500 a maximum possible time for performing maneuvers as shown. The floor mounted launch point also allows the robot 1500 to be controlled/operated to ready it for launch from ground level, which is an important convenience when compared to a pendulum launch.

Figure 14A:
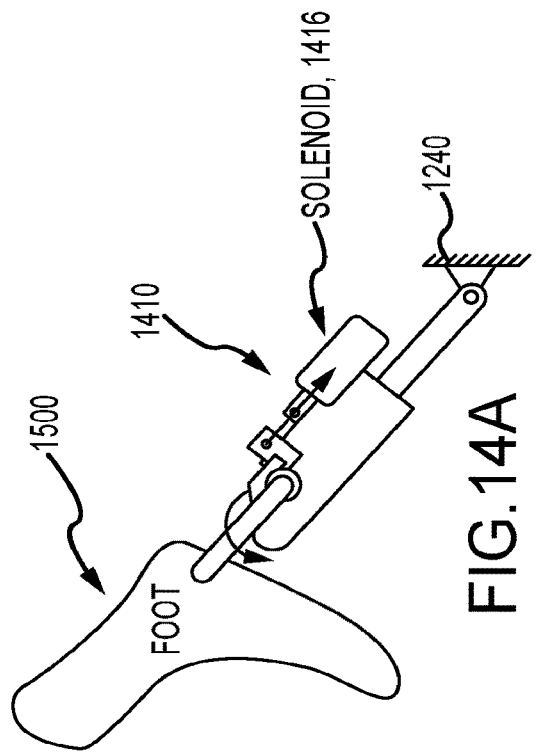
FIGS. 14a and 14b illustrate an embodiment of a foot release mechanism in a captured state and in a released state, respectively.
Figure 14B:
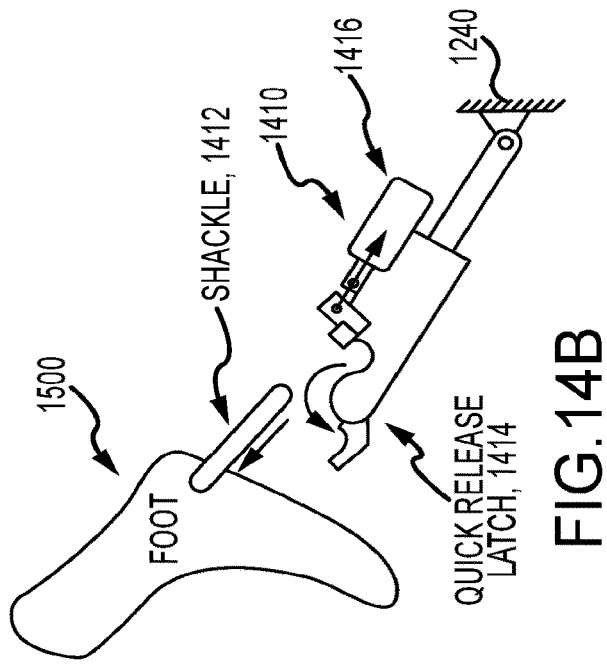

With regard to the ground station, FIGS. 14A and 14B illustrate a ground station 1410 in two operating states (robot capture and robot release), and the ground station 1410 is shown to include a shackle 1412 on the robot 1500, a quick release latch 1414, and an actuator/solenoid 1416. The robot 1500 (or, more specifically, its feet via shackle 1412) is first attached as shown in FIG. 14A to two quick release latches/clamps 1414, which are mounted to the ground 1240 such as via a whippletree mechanism. The whippletree mechanism guarantees even loading between the two feet in case of slight differences in leg length and accommodates small errors in release timing synchronization. The releases 1414 are driven by individual solenoids 1416, and the solenoids 1416 are independently powered and controlled by the robot's microprocessors. To accomplish this, the robot 1500 was attached via a magnetically-releasable USB umbilical to the solenoids' drive electronics. When these solenoids 1416 actuate, the latches 1414 release the feet of the robot 1500 and the dynamics of the counterweight-robot system launch the robot 1500 forward and upward, severing magnetic connection.

With regards to the cable 1210 and the counterweight 1212, the robot's hands were attached to an end 1211 of the cable 1210 (e.g., a cable formed of ³⁄₁₆-inch Technora 12™ or the like). The cable 1210 was arranged so as to extend up to a pulley 1216, which was mounted some distance in the air above the ground/floor 1240 such as about 14 feet in the air, and then the cable 1210 was run back behind the robot 1500 to another higher mounted (e.g., ceiling mounted) pulley 1214. The cable 1210 then extended down from this pulley 1214 and was attached to a counterweight 1212 (e.g., a 40-lb weight).

Figure 13:
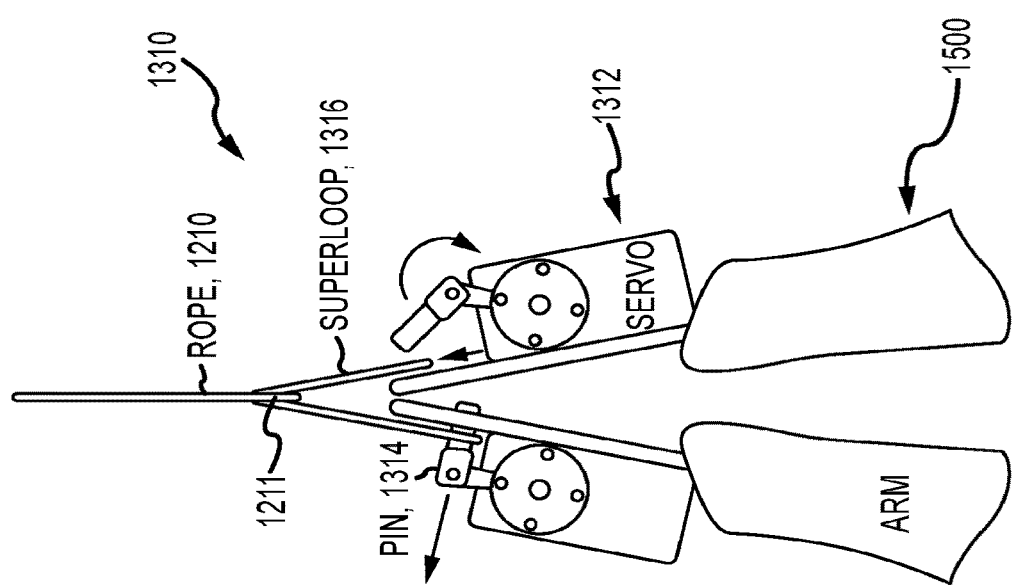
FIG. 13 illustrates one embodiment of a hand release mechanism.

FIG. 13 illustrates one useful embodiment of a hand-cable interface 1310 for use in system 1200. The hand servos 1312 of the robot 1500 drive pins 1314 that interface with a loop 1316 (e.g., of ³⁄₁₆-inch Technora 12™ or the like) at the end 1211 of the launch cable 1210, as shown in FIG. 13. This two-stage attachment procedure guarantees that the robot 1500 will release from the rope/cable 1210 even if one of the servos 1312 fails to fire or fires asymmetrically relative to its twin. At the end of its ballistic trajectory 1230, the robot 1500 lands in a large catchment net 1250 that may be made of spandex or other similar elastic materials. The net 1250 can be attached to a metal (e.g., steel or the like) frame via spring elements such as bungee cords. Typical decelerations found in testing were on the order of 50 m/s2. The following Table II provides some of the physical properties of the acrobot or ballistic robot prototyped by the inventors.

TABLE II

Physical Properties of the Prototyped Ballistic Robot

| Part | Mass (g) | $I_{xx}$ (gm$^2$) | $I_{yy}$ (gm$^2$) | $I_{zz}$ (gm$^2$) |
| --- | --- | --- | --- | --- |
| Head | 510 | 1.26 | 0.56 | 1.00 |
| Arm | 493 | 5.84 | 0.09 | 5.82 |
| Chest | 515 | 1.67 | 1.34 | 2.07 |
| Core | 1150 | 1.29 | 0.80 | 1.91 |
| Hip | 144 | 0.04 | 0.05 | 0.07 |
| Thigh | 656 | 2.55 | 0.20 | 2.55 |
| Shank | 602 | 3.61 | 0.13 | 3.61 |

Turning now to a discussion of launch dynamics, once released from the ground station, the cable 1210 applies a force at the robot's hands in the direction of the first pulley 1216. The exact value of this force is dependent on the inertial and gravitational effects acting on both the counterweight 1212 and the robot 1500. If the robot 1500 had no rotational inertia, the center of mass would fall in line with this force and the rotational velocity of the robot 1500 would match the rotational velocity of the cable 1210, which acts as a variable-length pendulum. This would naturally result in a backflip of some kind. In practice, keeping the robot 1500 in a flat layout pose throughout the entire experiment produced just such a rotation, with some small deviations as the robot's real rotational inertia causes its angular velocity to alternatively lag and lead the rotation of the cable 1210.

Figure 16:
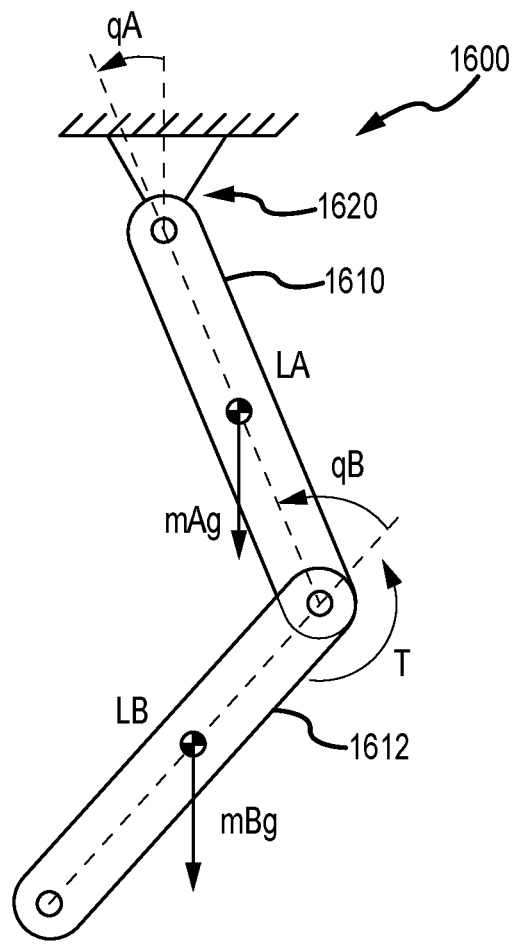
FIG. 16 illustrates a simple model of the ballistic robot of FIG. 15 for pumping using two rigid bodies or links.

When still attached to the cable 1210, the robot 1500 can be approximated as a pendulum attached to a larger pendulum. By actuating the robot 1500 to perform pumping, the robot 1500 can change its angular velocity. The inventors developed a simple model of pumping 1600 as illustrated in FIG. 16. The robot 1500 is represented in model 1600 as a two-link object (with two links 1610, 1612) connected to the world via a pin-joint 1620 at the top of the assembly. A torque, T, can be applied between the two links 1610, 1612, inducing a rotation. The following equations can be used to determine the motion of the system:

$$^N H^{S/N_o} = ^N H^{A/N_o} + ^N H^{B/N_o} \quad \text{Eq. (5)}$$

$$^N H^{A/N_o} = \underline{I}^{A/ACM} \cdot ^N \omega^A + r^{ACM/N_o} \times m^A {}^N v^{ACM} \quad \text{Eq. (6)}$$

$$^N H^{B/N_o} = \underline{I}^{B/BCM} \cdot ^N \omega^B + r^{BCM/N_o} \times m^B {}^N v^{BCM} \quad \text{Eq. (7)}$$

Figure 17:
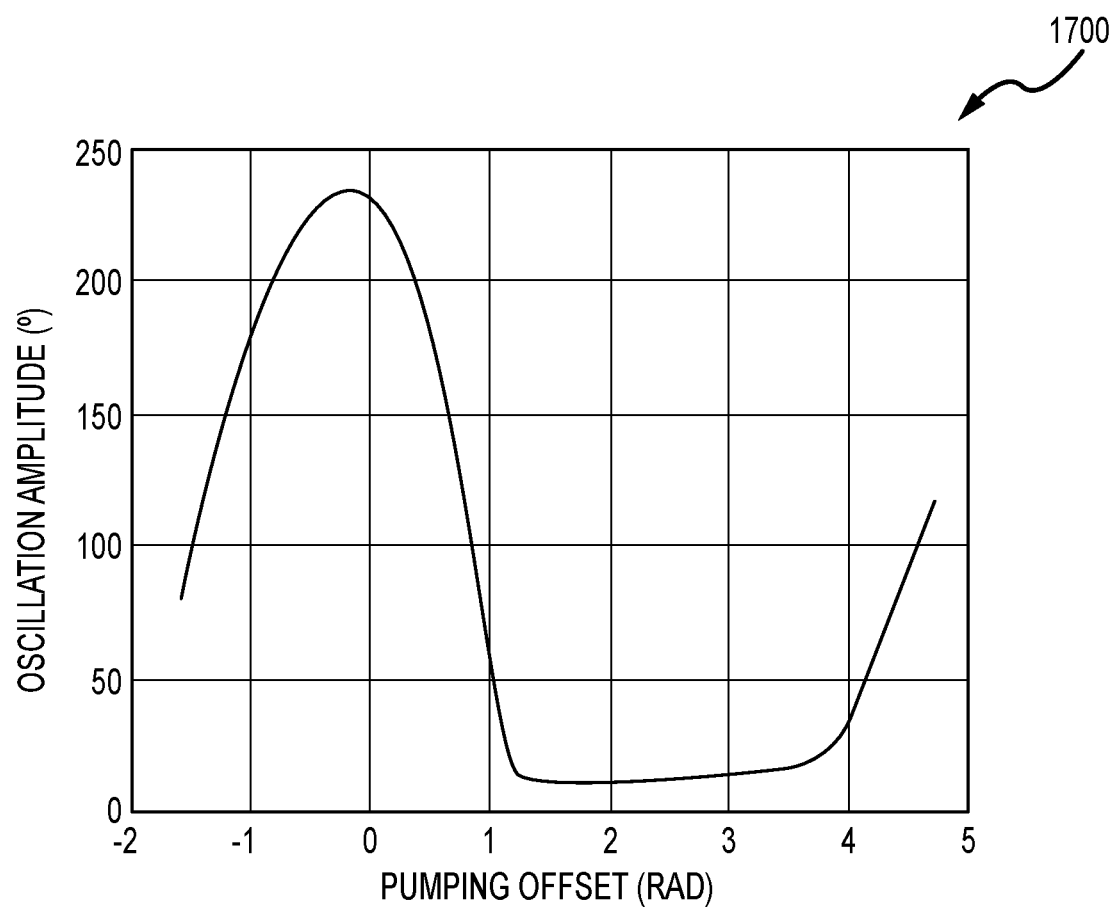
FIG. 17 is a graph showing the effect of pumping phase offset on the oscillation amplitude.
Figure 18:
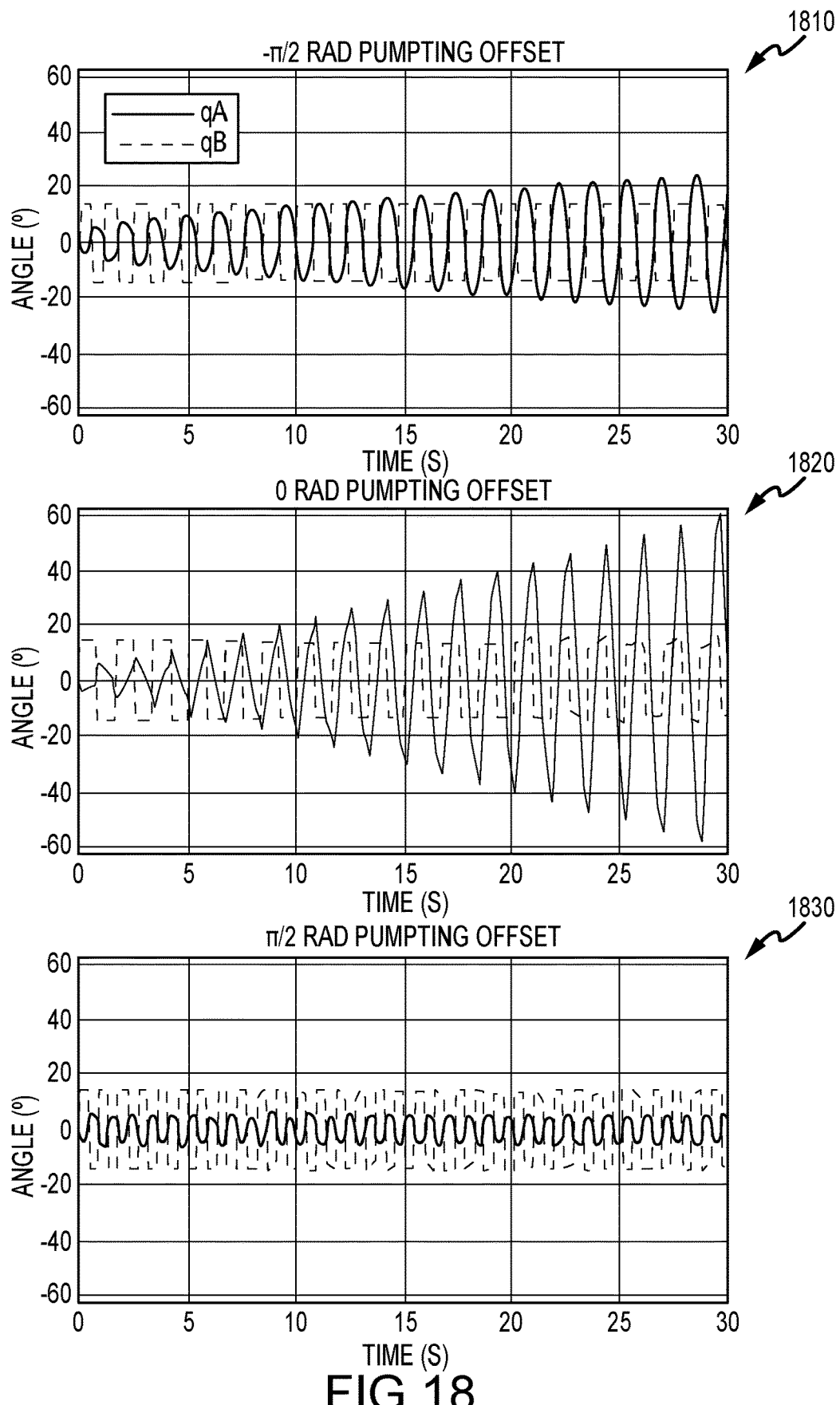
FIG. 18 illustrates with three graphs the effect of the pumping phase offset on oscillation angle.

Feeding this into a numerical simulator allowed the inventors to evaluate the most advantageous time to inject energy into the system through pumping, with the goal being in one embodiment the largest possible rate of change in amplitude. FIGS. 17 and 18 with graphs 1700, 1810, 1820, and 1830 illustrate the results of these experiments, with the conclusion being that the most effective time to pump is when the angular momentum of the system crosses zero.

Turning to sensing in the ballistic robot system, an acrobatic performance involves achieving specified poses for the robot 1500 at appropriate times. In both visual and practical terms, the pose and orientation at the time of landing often are the most important. Visually, landing in the proper orientation communicates that the maneuver went as planned. Practically, a complex robot will have a set of poses and orientations at impact that are more and less likely to cause damage to the structure. For this reason, it can be critically important to sense the motion of the robot in a way that helps one to predict its pose and orientation at landing time.

This involves predicting the evolution of orientation over time and predicting the amount of time expected before impact. The former is the principal area of investigation for the following discussion, but it only becomes practically useful if one also does a good job of the latter predicting. Initially, it may be useful to discuss one useful approach to predicting the time of impact used by the inventors. If the aerodynamic effects are neglected, then the ballistic motion of the center of mass is eminently predictable once the robot has detached from the launch apparatus. The problem then reduces to estimating the vertical position and velocity of the center of mass.

A variety of approaches to solving this estimating problem may be utilized. For example, an external motion capture system may be used to provide a high-resolution position estimate, which then can be transmitted to the robot over some kind of wireless connection. Marker placement becomes somewhat challenging because the robot assumes a wide range of poses and orientations over a large range of linear positions. A variety of time of flight sensors, from laser to ultrasonic, can be mounted to the robot to estimate its height above the ground. If the motion happens in a controlled environment, beacons can be placed at known locations to enable triangulation of position. Since the time of launch and flight is fairly short, an inertial dead reckoning solution is also a useful option. To help choose the appropriate sensor, a goal for error in the time of flight estimation can be defined. If the robot is rotating at a few revolutions per second, and it is desirable to control velocity to within a few tens of degrees, then it may be desirable to predict flight time with accuracies on the order of 10 ms.

Figure 19:
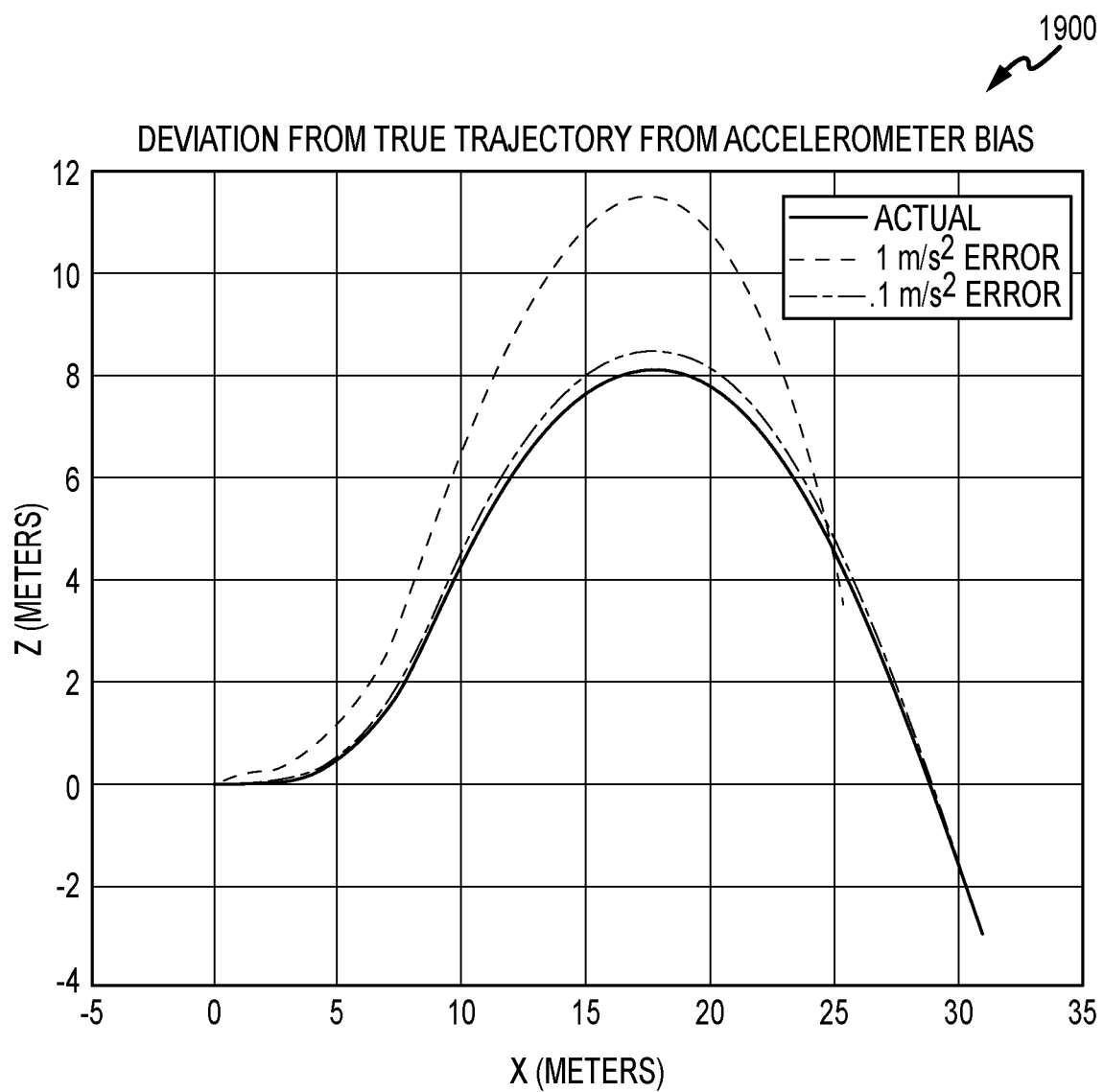
FIG. 19 is a graph that is useful for illustrating the effect of simulated bias in the z-axis accelerometer over the position estimation of a single launch of the ballistic robot of FIG. 15.

The inventors were interested in exploring a solution using inertial dead reckoning since the system already included an IMU for observing angular velocities. In order to understand the requirements for such a system, the inventors' numerical simulation was used to predict the actual accelerations and angular velocities for a typical launch. The accelerations and angular velocities were then converted into the body frame to create the output of a simulated ideal sensor. By intentionally adding bias and scale errors to this simulated sensor, the effect on flight time estimate of these non-idealities can be predicted. FIG. 19 illustrates with graph 1900 the deviation from predicted trajectory caused by simulated errors in accelerometer bias in the body z axis.

Figure 20:
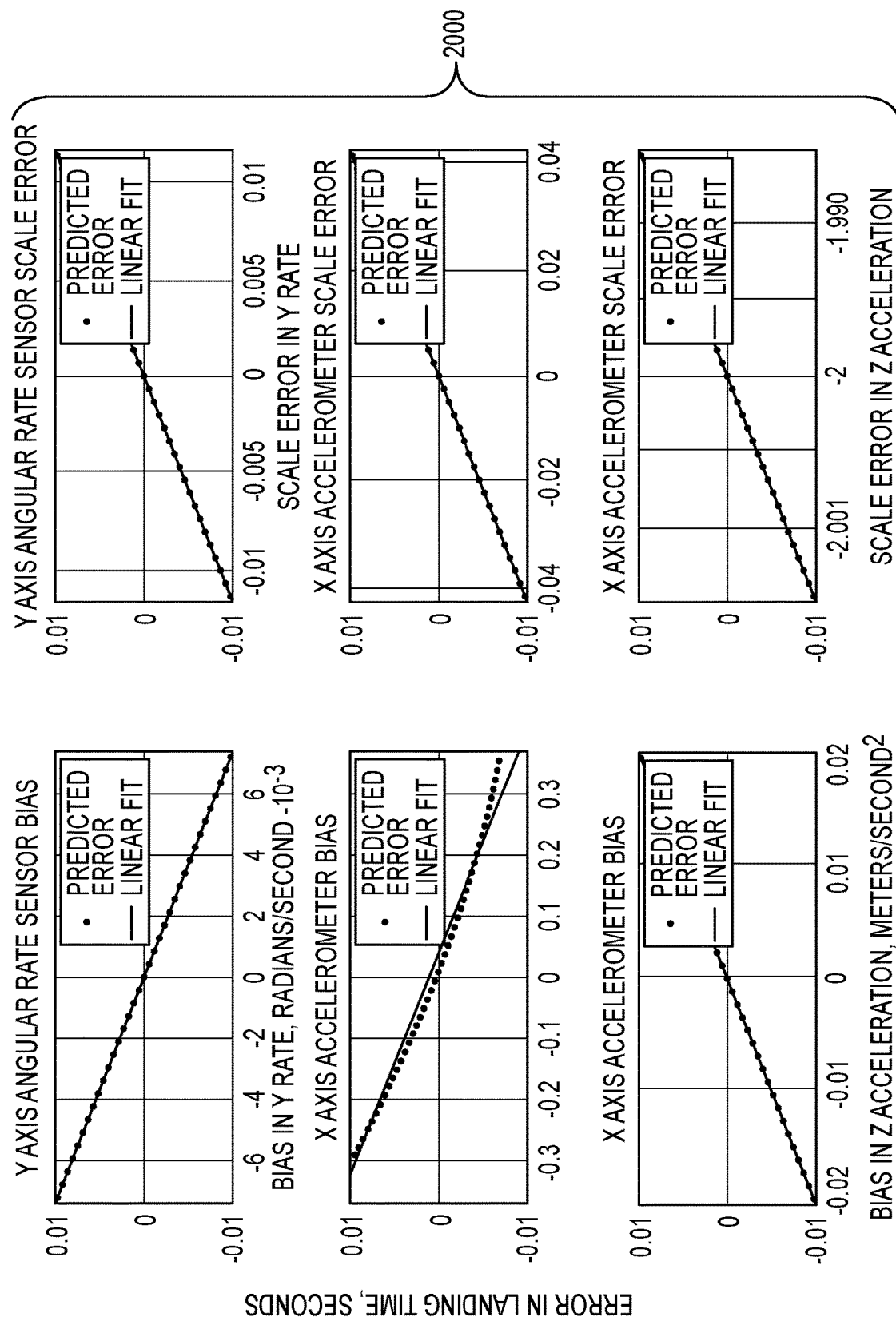
FIG. 20 provides a set of graphs showing linearity of effect of sensor non-idealities over a range of interest.

In sweeping the parameter space to predict the effects of multiple sensor non-idealities, the inventors observed that the largest impact was made by changes to the following three sensors: the angular rate sensor in body y and the acceleration sensors in body x and z. This is because the motion and rotation during launch occurs mainly in the body xz plane. The inventors also observed that for the range of errors under investigation, the effect of each non-ideality could be approximated as a linear effect, as shown with the set of graphs 2000 of FIG. 20.

Figure 21:
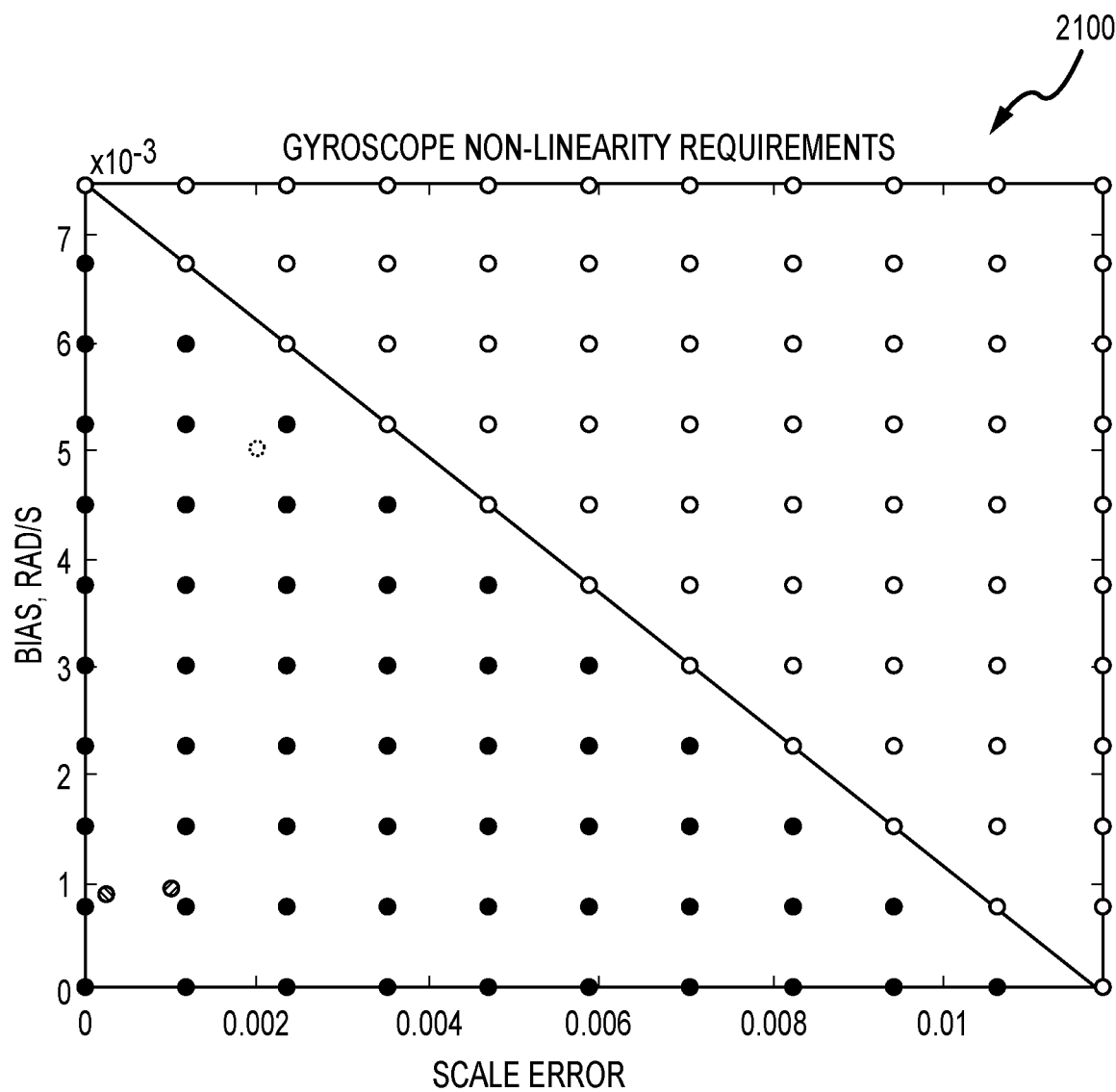
FIG. 21 is a graph showing a region of acceptable error for gyroscope nonlinearities.
Figure 22:
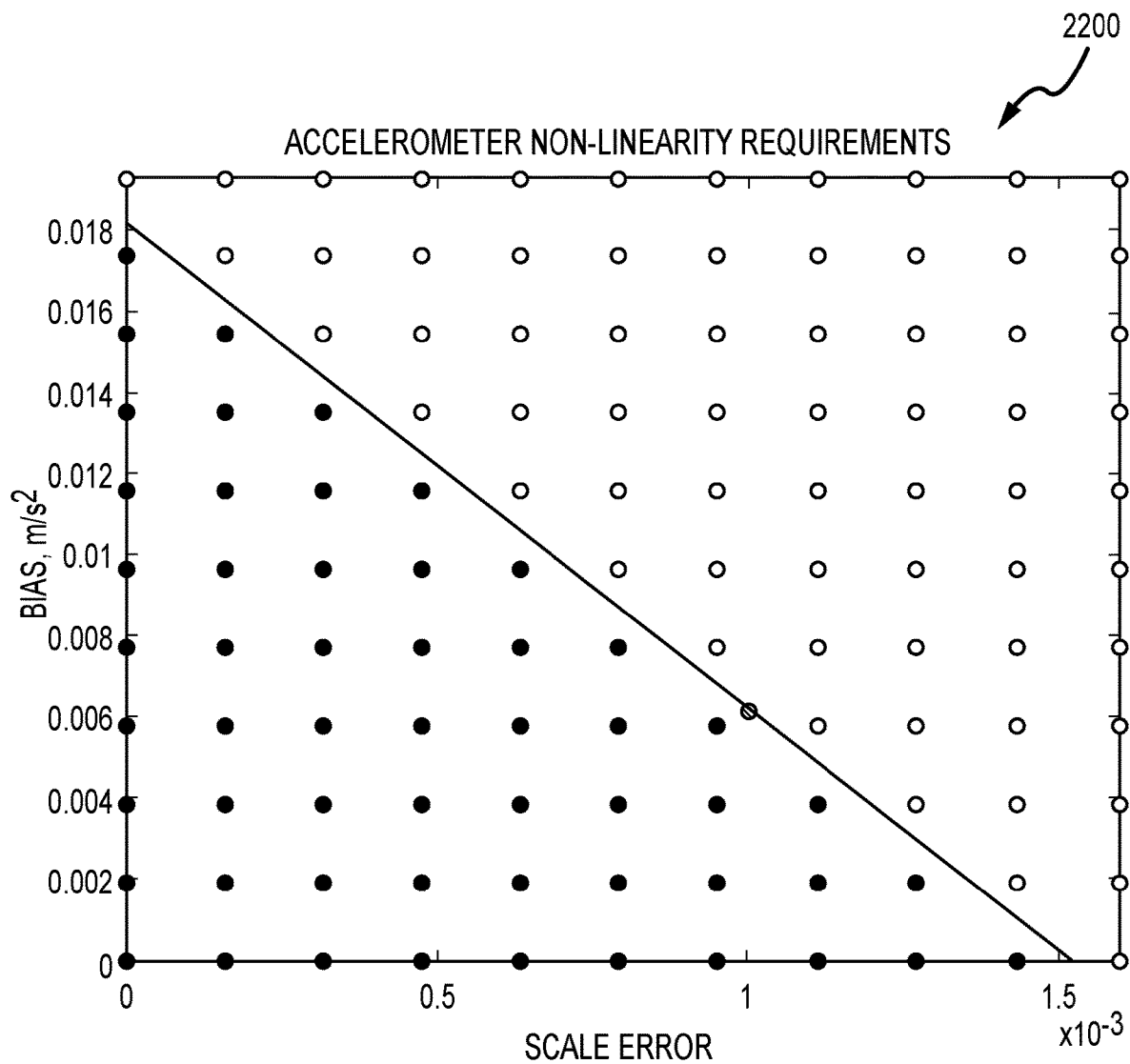
FIG. 22 is a graph showing a region of acceptable error for accelerometer nonlinearity.

The errors were also found to be reasonably independent. Errors in bias and scale were selected to produce 1 plus/minus 0.01 ms of error in landing time estimation when applied individually to either the y-axis rate sensor, the x-axis accelerometer, or the z-axis accelerometer. These six error types were then combined in all possible permutations with a resulting maximum error of 6.05 ms. Based on this analysis, the combination of sensing specifications likely to lead to the necessary accuracy in time of flight estimation can be predicted. FIGS. 21 and 22 show with graphs 2100 and 2200, respectively, the allowable space in a variety of error combinations over a reduced set for visualization purposes. In FIGS. 21 and 22, the open circle dots and the filled circle dots are from full integrated empirical sweep, the black line if from independent linear approximation, and the other dots represent evaluated sensor specifications.

Three sensors were evaluated by the inventors during testing/experimentation with the robot 1500 and system 1200 of FIG. 12: (1) the BNO055; (2) the VN-100, and (3) the VN-110. The specifications that map most directly to bias are the in-run bias stability and the run-to-run bias variation. To get a sense of worst-case performance, model noise can be aggressively modeled as a bias equal to the standard deviation of the signal at the frequency of interest. For scale errors, specifications on linearity are a relevant metric. The specifications for each of the evaluated sensors are plotted on the constraint graphs 2100 and 2200 of FIGS. 21 and 22. All three of the sensors had predicted gyroscope performance within the targeted tolerances, although the VN-110 had the smallest predicted error. For accelerometer performance, only the VN-110 was within the inventors' ideal limit.

In most MEMS sensors, the z-axis is noisier and less consistent than the x and y axes due to manufacturing issues. Since the important acceleration axes are the body x and z axes, the sensor may preferably be oriented so that the sensor z axis points along the body y axis. This means that the least reliable gyroscope axis is used to measure the most important rotational axis, but, as discussed above, the predicted error from the gyroscope is much smaller than the predicted error due to the accelerometer. Once position of the sensor is known, it the position of the center of the mass is calculated. Since the center of mass location changes as the robot's configuration changes, this involves both accurate encoder information and a knowledge of the robot's mass distribution.

Figure 23:
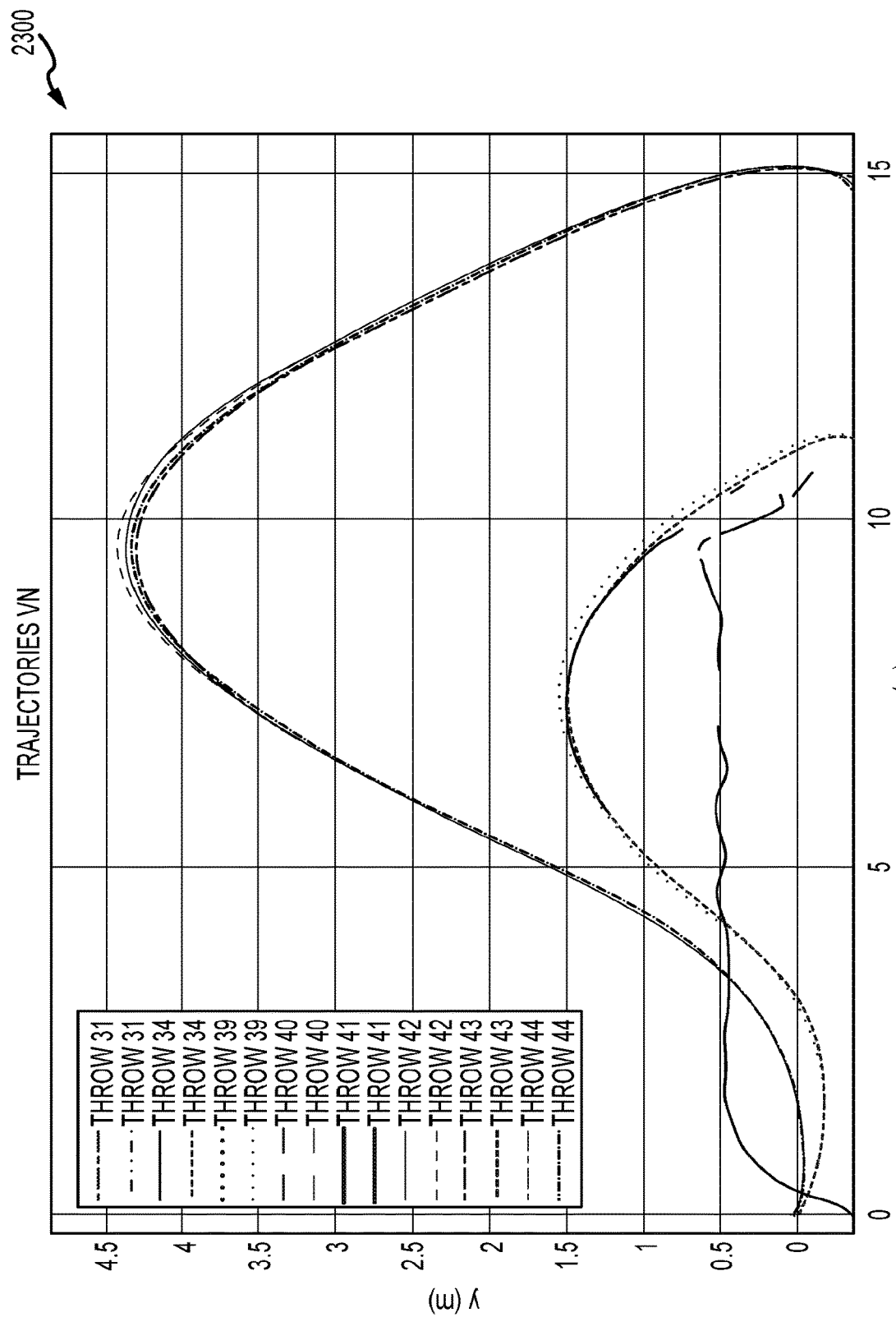
FIG. 23 is a graph showing estimate versus actual position for eight throws/launches.

Once the sensor was selected, the inventors in their prototype of robot 1500 mounted the sensor to a test rig and launched it multiple times. The inventors discovered that performance was improved by allowing the device to remain motionless for a few tens of seconds prior to launch to allow the internal gravity vector estimate to stabilize. A set of eight launches is shown in graph 2300 of FIG. 23 (compared to ground-truth data acquired via an Opti-track motion capture system), with the VN-110 used for inertial dead reckoning. The average error in predicted landing time was 40 ms with a standard deviation of 10 ms.

With regard to flip control, once time in the air is accurately estimated, a simple controller was implemented to manage landing position. The following algorithm was used in one prototyped controller: (a) calculate the orientation of the robot by projecting the longitudinal axis of the core onto the plane of motion and taking its angle with respect to the vertical; (b) multiply the current angular velocity by the predicted time remaining in the air and add the result to the current orientation to estimate final pose; (c) if the predicted final pose rotates past the goal pose, extend the limbs of the robot towards a full layout position; and (d) if the predicted final pose comes short of the goal pose, retract the limbs of the robot towards a tight tuck position. In practice, the inventors were able to use this algorithm to achieve landing orientations with a standard deviation of approximately 10 degrees and a constant bias of about 45 degrees due to a consistent error in landing time calculation.

With regard to twist control, the physical prototype of the robot 1500 included multiple moving members that move to change its inertia. One way to simulate the motion of the robot as it rotates in the air is to consider it as a rigid body with a variable inertia. This simplification reduces the complexity of the resulting 3D equations of motion but includes a differentiated inertia term to the traditional formulation. Neglecting aerodynamic forces, a body in free fall will conserve its angular momentum as follows:

$$^N H^{B/BCM} = \underline{I}^{B/BCM} \cdot ^N \omega^B \qquad \text{Eq. (8)}$$

where $\underline{I}^{B/BCM}$ is the body inertia matrix around its center of mass and $^N\omega^B$ is its angular velocity vector. Differentiating the angular momentum yields:

$$\frac{d^N H^{B/BCM}}{dt} = \frac{d\underline{I}^{B/BCM}}{dt} \cdot ^N\omega^B + \cdot \frac{d^N\omega^B}{dt} = 0 \qquad \text{Eq. (9)}$$

From Eq. (9), it is possible to simulate the behavior of the robot in 3D and predict the effect of a change in inertia on the orientation of the robot. For example, for a rigid body experiencing a simple rotation around the x axis, the equations of motion become $\dot{\omega}_x = \dot{I}_{xx}/I_{xx} \omega_x$. There, $\dot{I}_{xx}$ is the derivative of the inertia. $I_{xx}$ is the current inertia, which can be represented as $I_{xx,0} + \dot{I}_{xx} * t$, where $I_{xx,0}$ is a constant initial inertia and t is the time. This formulation was compared by the inventors to the real results of the robot's twist behavior and found to be informative. The controller of the robot may be configured based on this approach. In some cases, it may be useful to command the robot (such as robot 1500 of FIG. 15) to assume a predetermined asymmetric pose to see the amount of control authority available.

Using empirical fine tuning, the inventors with their prototype of robot 1500 were able to achieve landings with no twist and with a half-twist in either direction as they desired. The testing with system 1200 of FIG. 12, it was found that the robot 1500 was controllable to do front, back, and no flips in alignment with trend from the pumping model. It was further found that using the appropriately specified sensor that the time in the air can be accurately predicted. Additionally, it was proven that the robot can be controlled via actuated configurations to twist in both directions. Still further, the inventors determined that the robot/acrobot can use control both on and off the pendulum to land exactly how the stunt/show designers want it to land after performing a range of different stunts while on the ballistic trajectory.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A ballistic robot system comprising:
    a robot comprising a controller, onboard sensors, a body supporting the controller and onboard sensors, and at least one component that is configured for actuation by the controller;
    a catching system with a landing surface at a first location; and
    a launch mechanism at a second location that is spaced apart from the landing surface a lateral distance, wherein the launch mechanism operates to first support the robot during a pre-launch process stage during which energy is provided to the body of the robot and to second launch the body of the robot as a ballistic body with a trajectory defining a flight path intersecting the landing surface and wherein the launch mechanism remains at the second location during and after the launch of the body of the robot, wherein the controller processes data collected by the onboard sensors while flying on the flight path including calculating an angular velocity and remaining time prior to the impact with the landing surface and generates a control signal to cause the actuation of the at least one component to cause the body to perform a predefined controlled motion prior to impact with the landing surface.

2. The system of claim 1, wherein the predefined controlled motion is adapted and timed during the flying on the flight path to cause the body to have a predefined pose, a predefined orientation, or a predefined landing angle upon impact with the landing surface.

3. The system of claim 2, wherein the at least one component is configured for moving the body between a tucked configuration and an untucked configuration and wherein the predefined controlled motion is a movement from the tucked configuration to the untucked configuration prior to the impact with the landing surface.

4. The system of claim 1, wherein the onboard sensors comprise an inertial measurement unit (IMU) and at least one rangefinder and wherein the controller processes the data collected by the onboard sensors to determine a current angular velocity and a current height of the body while on the flight path.

5. The system of claim 1, further comprising an offboard sensor communicating collected data to the controller for processing to determine a current position of the body on the flight path, wherein the current position is used in determining a timing of triggering the control signal and wherein the offboard sensor includes at least one of a motion capture system, a floodlight providing polarized light received by a first photosensor on or in the body, and a laser providing a beam or plane of light received by a second photosensor on or in the body.

6. The system of claim 1, wherein the at least one component comprises an inertia moving assembly operating in response to the control signal to move the moment of inertia of the body.

7. The system of claim 1, wherein the at least one component comprises an actuator and a positionable appendage or link of the body and wherein the predefined controlled motion comprises moving the appendage or the link to modify spin of the body about at least one axis.

8. The system of claim 1, wherein the launch mechanism comprises a pendulum assembly with an elongate pendulum member, wherein the body of the robot is detachably coupled with an end of the elongate pendulum member, and wherein the pendulum assembly is gravity based or is powered to reach a predefined velocity when the launch is initiated.

9. The system of claim 8, wherein the controller operates during the pre-launch process stage to generate a second control signal to cause the actuation of the at least one component to cause the body to move with a second predefined controlled motion prior to the launch of the body on the trajectory.

10. The system of claim 9, wherein the second control signal is generated by the controller at a predefined time after initial movement of the elongate pendulum member in the pre-launch process stage and wherein the second predefined controlled motion is adapted to cause the body to spin in a predefined manner about at least one axis on the flight path.

11. The system of claim 10, wherein the at least one component is configured for moving the body between a tucked configuration and an untucked configuration and wherein the second predefined controlled motion is a movement from the untucked configuration to the tucked configuration prior to the launch from the launch mechanism.

12. The system of claim 1, wherein the at least one component comprises an actuatable element for modifying aerodynamic characteristics of one or more external surfaces of an appendage to the body of the robot or of the body of the robot to initiate the predefined controlled motion.

13. A ballistic robot system comprising:
a robot comprising a body, a controller mounted on the body, onboard sensors provided on the body including an IMU and at least one rangefinder, and a component configured for actuation in response to a control signal by the controller;
a catching system with a landing surface; and
a launch mechanism launching the body of the robot on a trajectory defining a flight path to land upon the landing surface, wherein the launch mechanism remains at a fixed location during and after the launch of the body of the robot and wherein the robot flies from the launch mechanism to the landing surface as a ballistic object,
wherein the controller processes data collected by the onboard sensors while flying on the flight path and, in response, generates a control signal to cause the actuation of the component causing an appendage, a link, or an internal weight to move from a first position to a second position, whereby the body moves on the flight path with a predefined controlled motion prior to impacting the landing surface,
wherein the predefined controlled motion is adapted and timed during the flying on the flight path to cause the body to have a predefined pose, a predefined orientation, or a predefined landing angle upon impact with the landing surface, and
wherein the processing of the data collected by the controller includes calculating an angular velocity and remaining time prior to the impact with the landing surface.

14. The system of claim 13, wherein the at least one component is configured for moving the body between a tucked configuration and an untucked configuration and wherein the predefined controlled motion is a movement from the tucked configuration to the untucked configuration prior to the impact with the landing surface.

15. The system of claim 13, wherein the onboard sensors comprise an inertial measurement unit (IMU) and at least one rangefinder, wherein the controller processes the data collected by the onboard sensors to determine a current angular velocity and a current height of the body while on the flight path, wherein the system further comprises an offboard sensor communicating collected data to the controller for processing to determine a current position of the body on the flight path, wherein the current position is used in determining a timing of triggering the control signal, and wherein the offboard sensor includes at least one of a motion capture system, a floodlight providing polarized light received by a first photosensor on or in the body, and a laser providing a beam or plane of light received by a second photosensor on or in the body.

16. A ballistic robot system comprising:

a robot comprising a controller, onboard sensors, and at least one component that is configured for actuation by the controller; and a launch mechanism operating first to support the robot during a pre-launch process stage during which energy is imparted to the robot and second to launch the body of the robot on a trajectory defining a flight path, the body of the robot acting as a ballistic object while following the flight path, wherein the controller processes data collected by the onboard sensors while flying on the flight path and, in response, generates a control signal to cause the actuation of the at least one component to cause the body to perform a predefined controlled motion prior to impact with the landing surface, wherein the launch mechanism comprises a pendulum assembly with an elongate pendulum member, wherein the body of the robot is detachably coupled with an end of the elongate pendulum member, wherein the controller operates during the pre-launch process stage to generate a second control signal to cause the actuation of the at least one component to cause the body to move with a second predefined controlled motion prior to the launch of the body on the trajectory, wherein the second predefined controlled motion is adapted to cause the body to spin in a predefined manner about at least one axis on the flight path, and wherein the controller processes the data collected by the onboard sensors to determine a current angular velocity and a current height of the body while on the flight path.

17. The system of claim 16, wherein the predefined controlled motion is adapted and timed during the flying on the flight path to cause the body to have a predefined pose, a predefined orientation, or a predefined landing angle upon impact with the landing surface.

18. The system of claim 17, wherein the at least one component is configured for moving the body between a tucked configuration and an untucked configuration and wherein the predefined controlled motion is a movement from the tucked configuration to the untucked configuration prior to the impact with the landing surface.

19. The system of claim 16, wherein the onboard sensors comprise an inertial measurement unit (IMU) and at least one rangefinder.

20. The system of claim 16, further comprising an offboard sensor communicating collected data to the controller for processing to determine a current position of the body on the flight path, wherein the current position is used in determining a timing of triggering the control signal and wherein the offboard sensor includes at least one of a motion capture system, a floodlight providing polarized light received by a first photosensor on or in the body, and a laser providing a beam or plane of light received by a second photosensor on or in the body.

21. The system of claim 16, wherein the at least one component comprises an inertia moving assembly operating in response to the control signal to move the moment of inertia of the body.

22. The system of claim 16, wherein the at least one component comprises an actuator and a repositionable appendage or link of the body and wherein the predefined controlled motion comprises moving the appendage or the link to modify spin of the body about at least one axis.

23. The system of claim 16, wherein the at least one component is configured for moving the body between a tucked configuration and an untucked configuration and wherein the second predefined controlled motion is a movement from the untucked configuration to the tucked configuration prior to the launch from the launch mechanism.

* * * * *